United States Patent [19]
French

[11] Patent Number: 6,108,219
[45] Date of Patent: Aug. 22, 2000

[54] DC POWER CONVERTER CIRCUIT

[75] Inventor: John French, Caledon East, Canada

[73] Assignee: Indigo Manufacturing Inc., Markham, Canada

[21] Appl. No.: 09/314,126

[22] Filed: May 19, 1999

Related U.S. Application Data

[60] Provisional application No. 60/114,864, Jan. 6, 1999.

[51] Int. Cl.[7] .................................................. H02M 3/335
[52] U.S. Cl. ................................................................ 363/23
[58] Field of Search ............................... 363/22, 230, 133

[56] References Cited

U.S. PATENT DOCUMENTS

| | | | |
|---|---|---|---|
| 3,270,269 | 8/1966 | Low | 363/23 |
| 3,789,289 | 1/1974 | Bell et al. | 363/23 |
| 3,818,314 | 6/1974 | Bishop et al. | 363/23 |
| 3,886,429 | 5/1975 | Maillard et al. | 363/23 |
| 4,319,315 | 3/1982 | Keeney, Jr. et al. | |
| 4,814,962 | 3/1989 | Magalhaes et al. | |
| 5,303,137 | 4/1994 | Peterson. | |
| 5,430,632 | 7/1995 | Meszlenyi. | |

*Primary Examiner*—Shawn Riley
*Attorney, Agent, or Firm*—Bereskin & Parr

[57] ABSTRACT

A self oscillating power converter uses two MOSFET transistors connected across first and second primary windings. Each MOSFET is controlled using a gate control circuit located in a feedback path. Each gate control circuit is driven by a gate drive winding which is transformer coupled to a primary winding and which is phased with the primary winding such that regenerative feedback causes accelerated sequential turn-on and turn-off of the associated MOSFET transistor. Each feedback path includes a capacitor for charging in response to the voltage generated across the gate drive winding to initiate turn-on of the MOSFET transistor and a resistor for discharging the capacitor to initiate turn-off of the MOSFET transistor. The power converter can be configured as a push-pull converter in either a common-drain or common-source configuration. The power converter can also be configured such that at least one MOSFET transistor is capacitively coupled to a primary winding. Further, the power converter can be configured as either a full-bridge or a half-bridge converter.

20 Claims, 13 Drawing Sheets

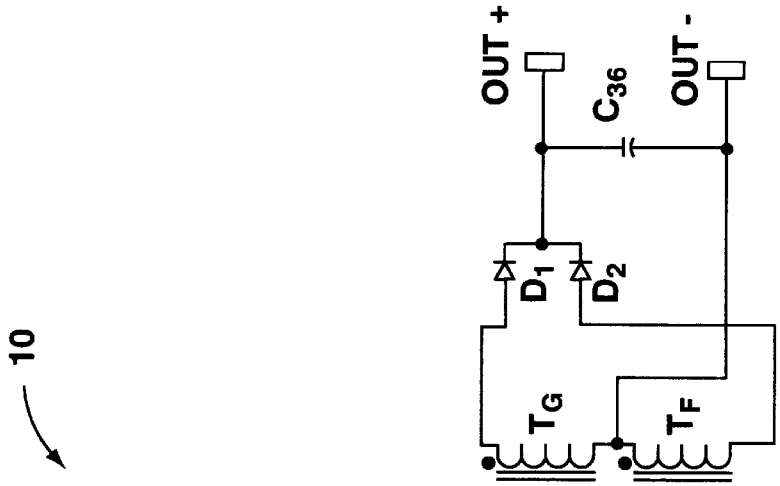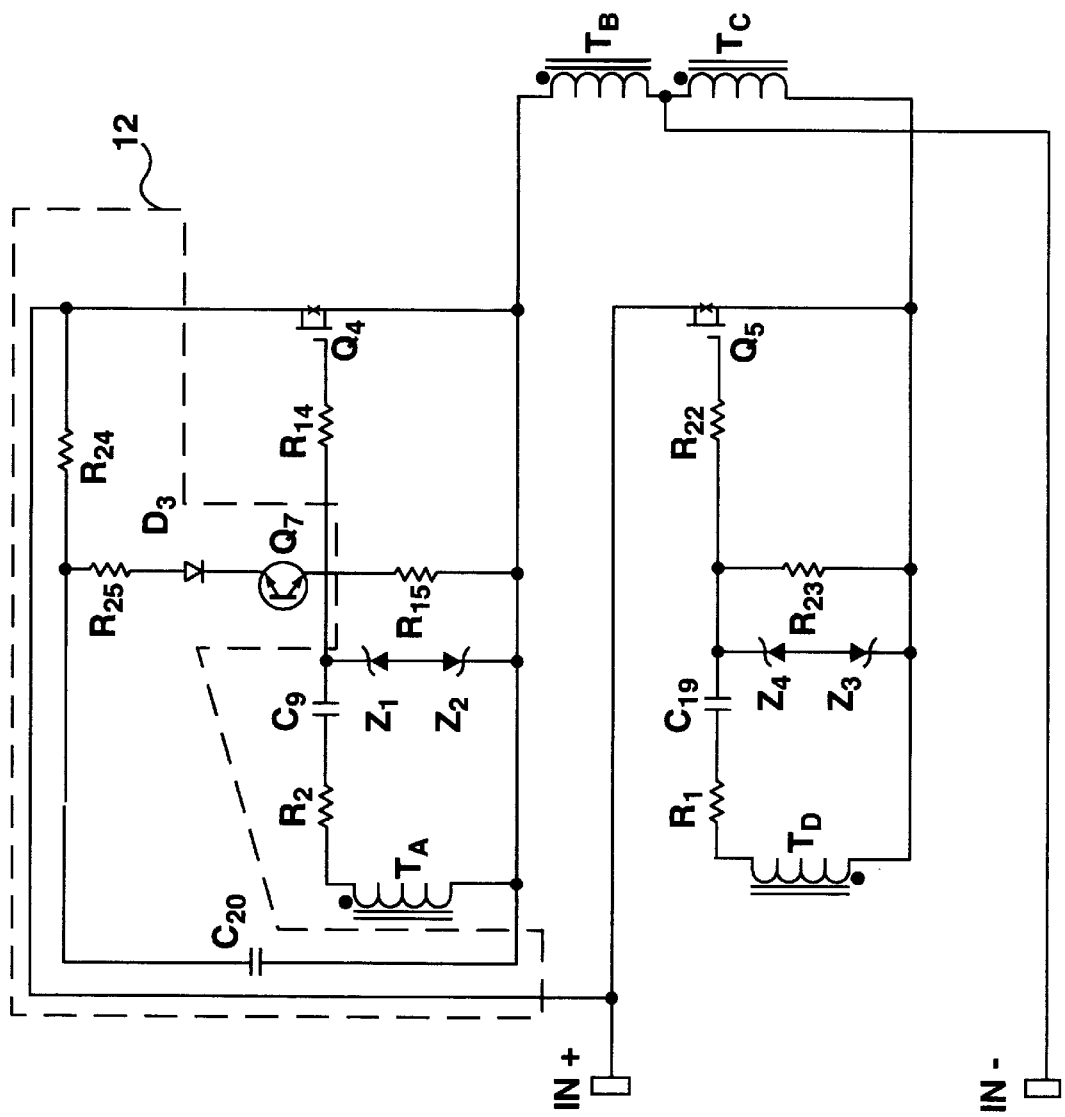
FIG. 1

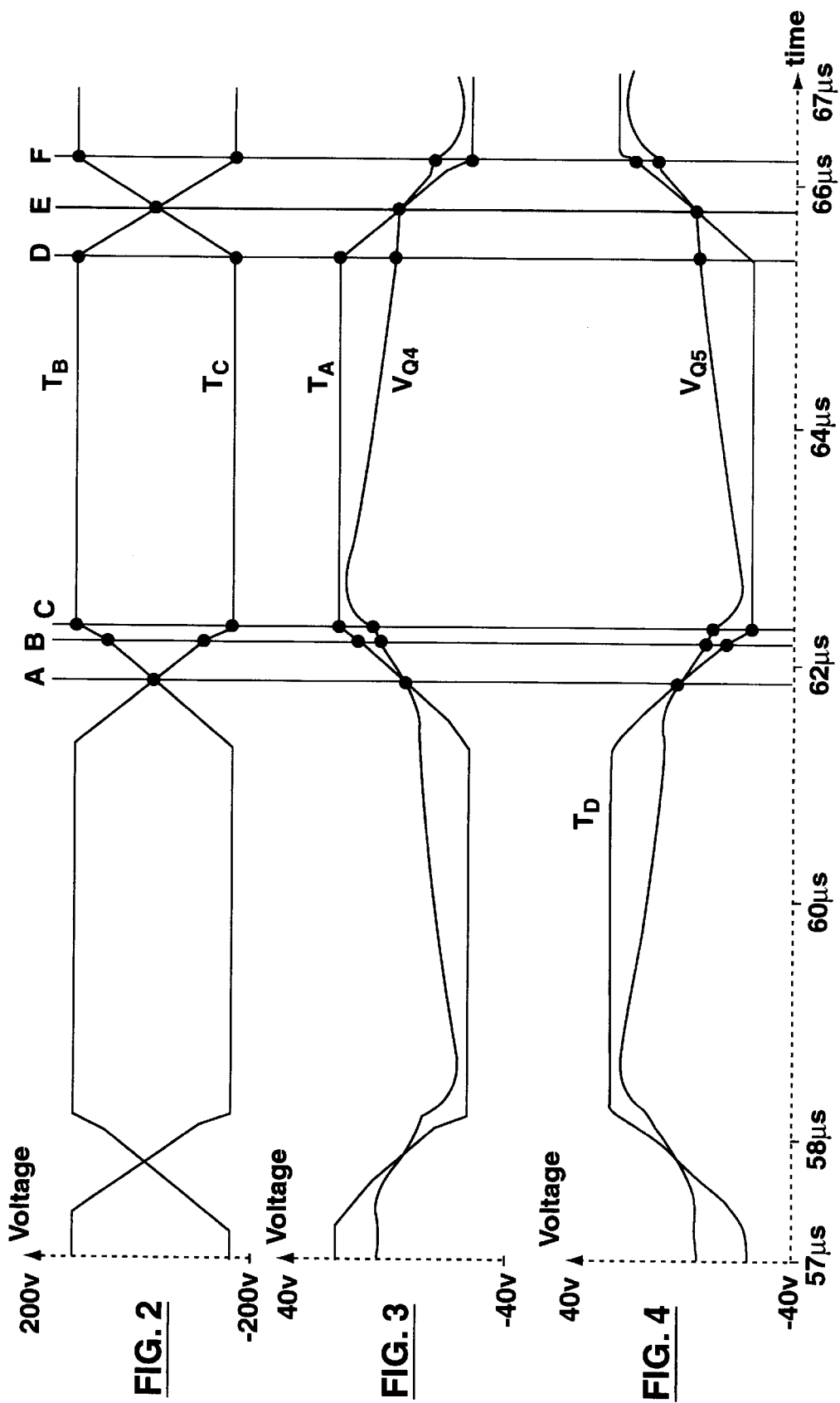

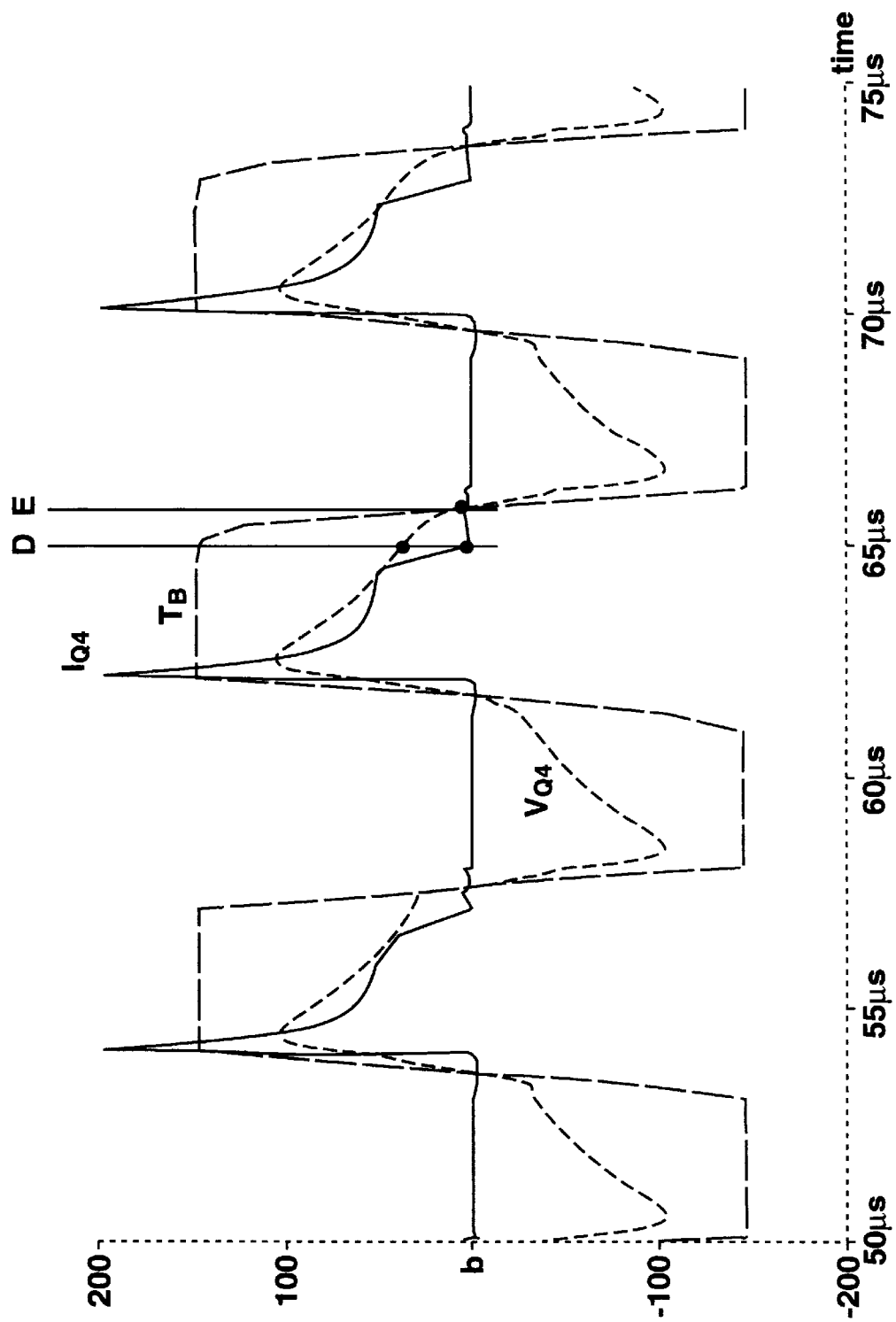

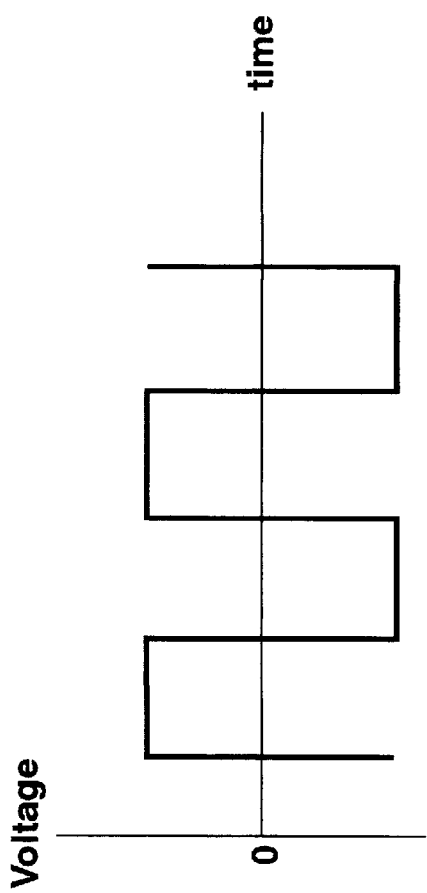
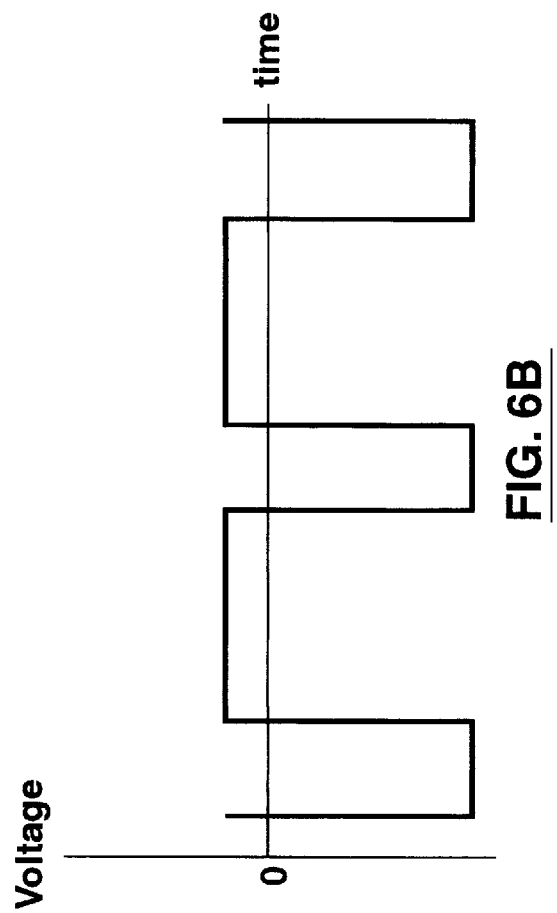

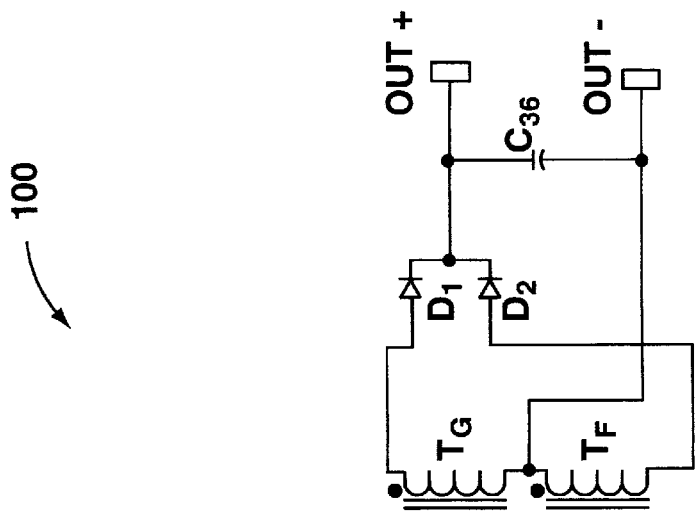
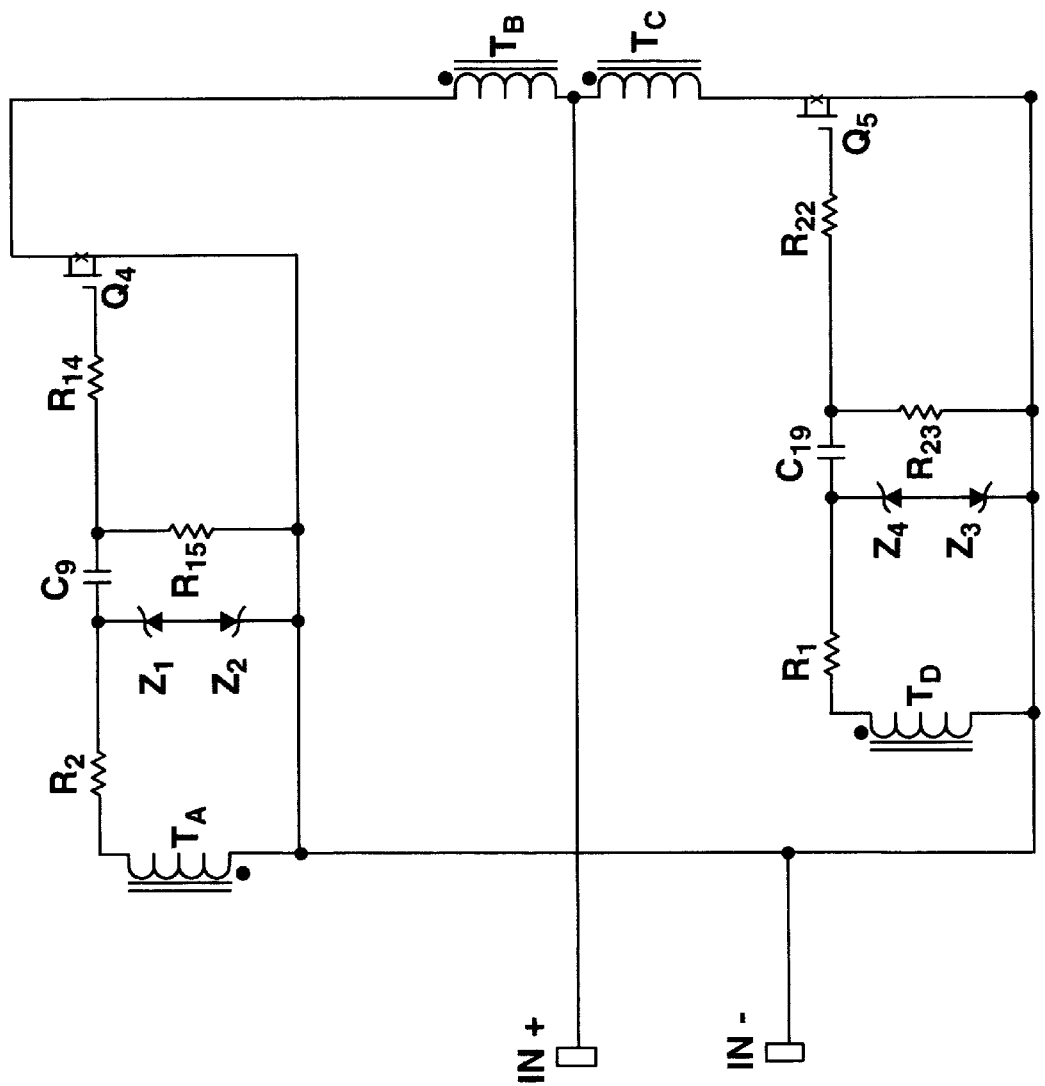
FIG. 8

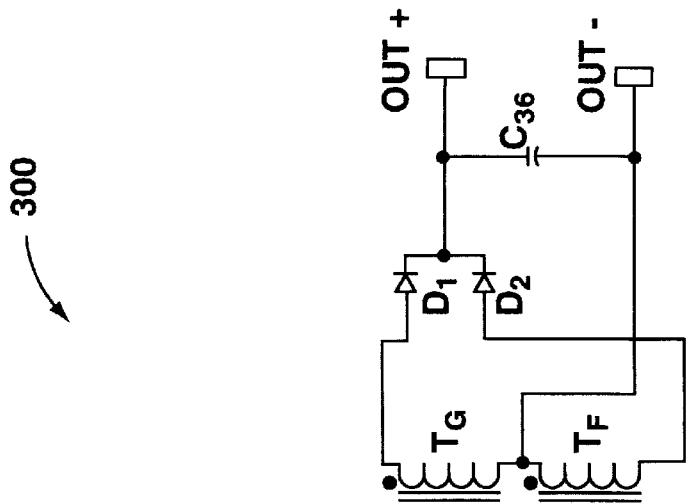
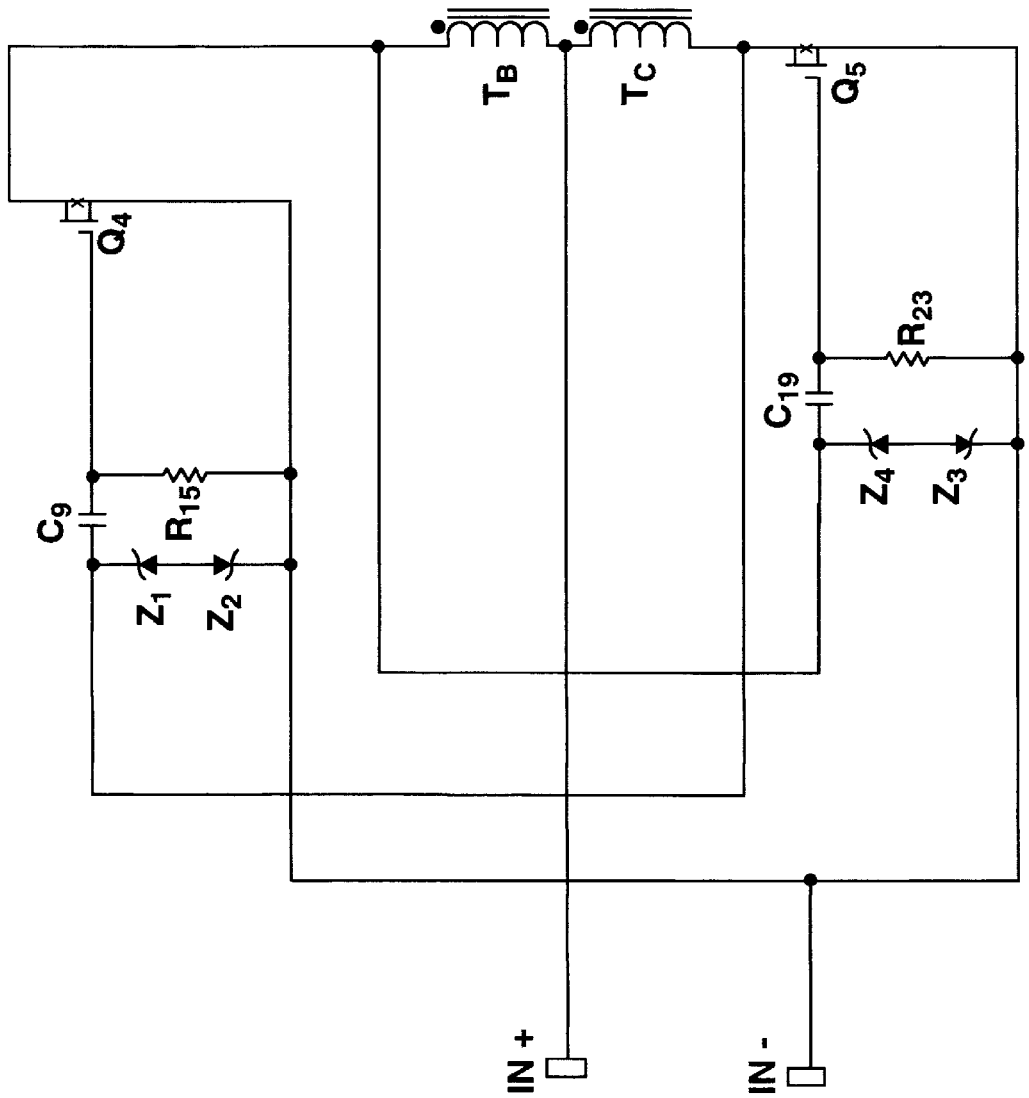
FIG. 10

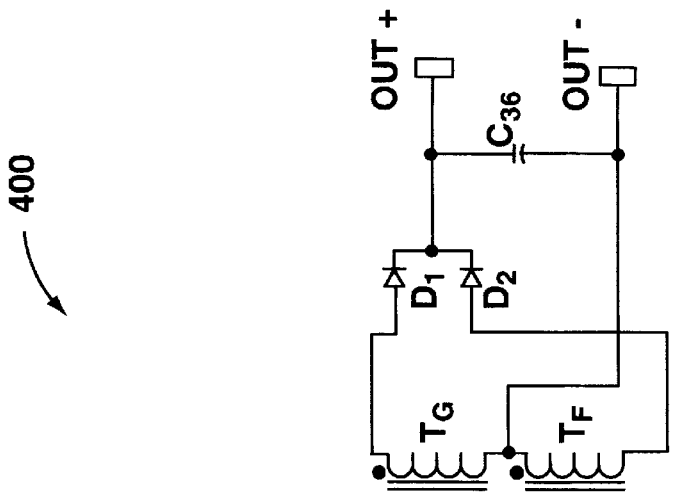
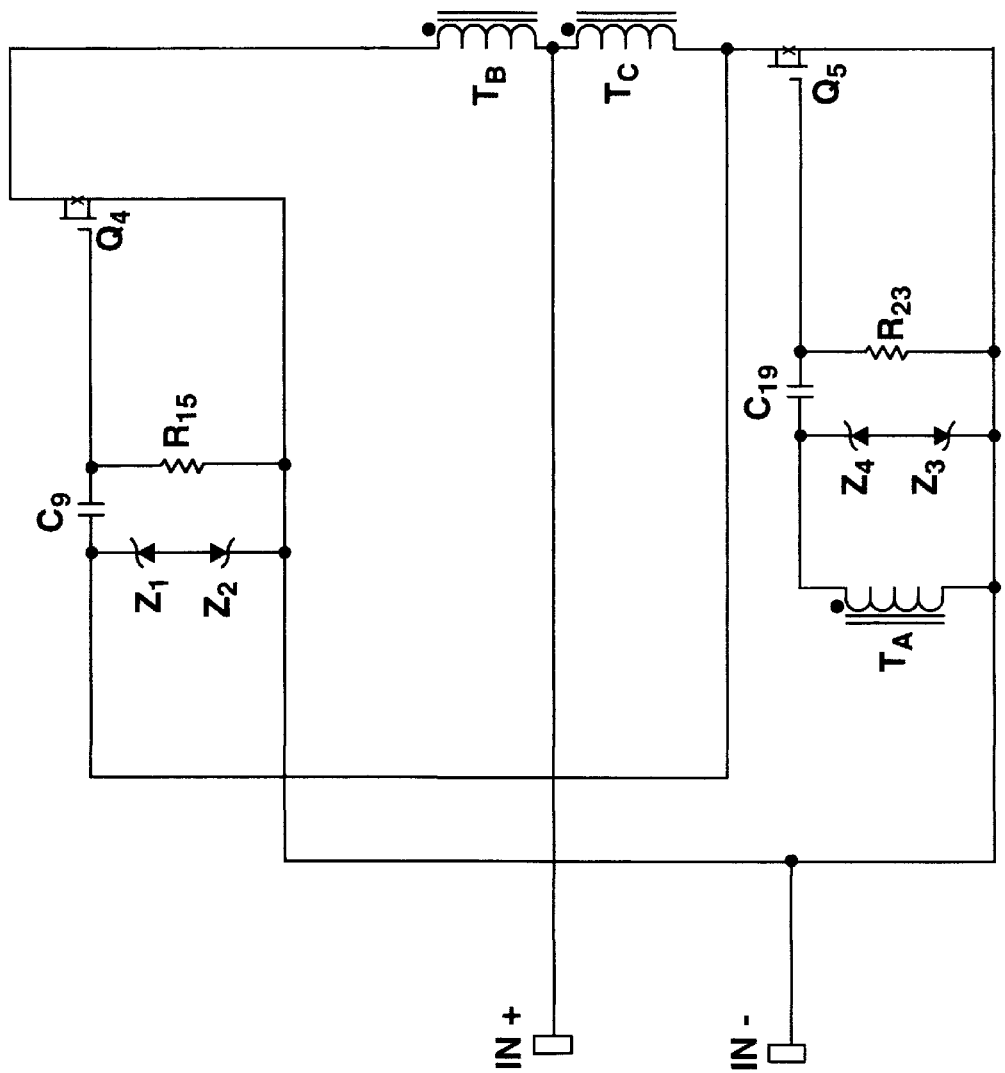
FIG. 11

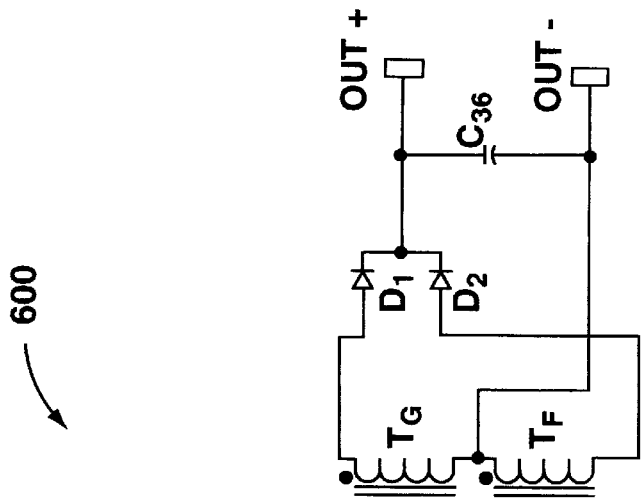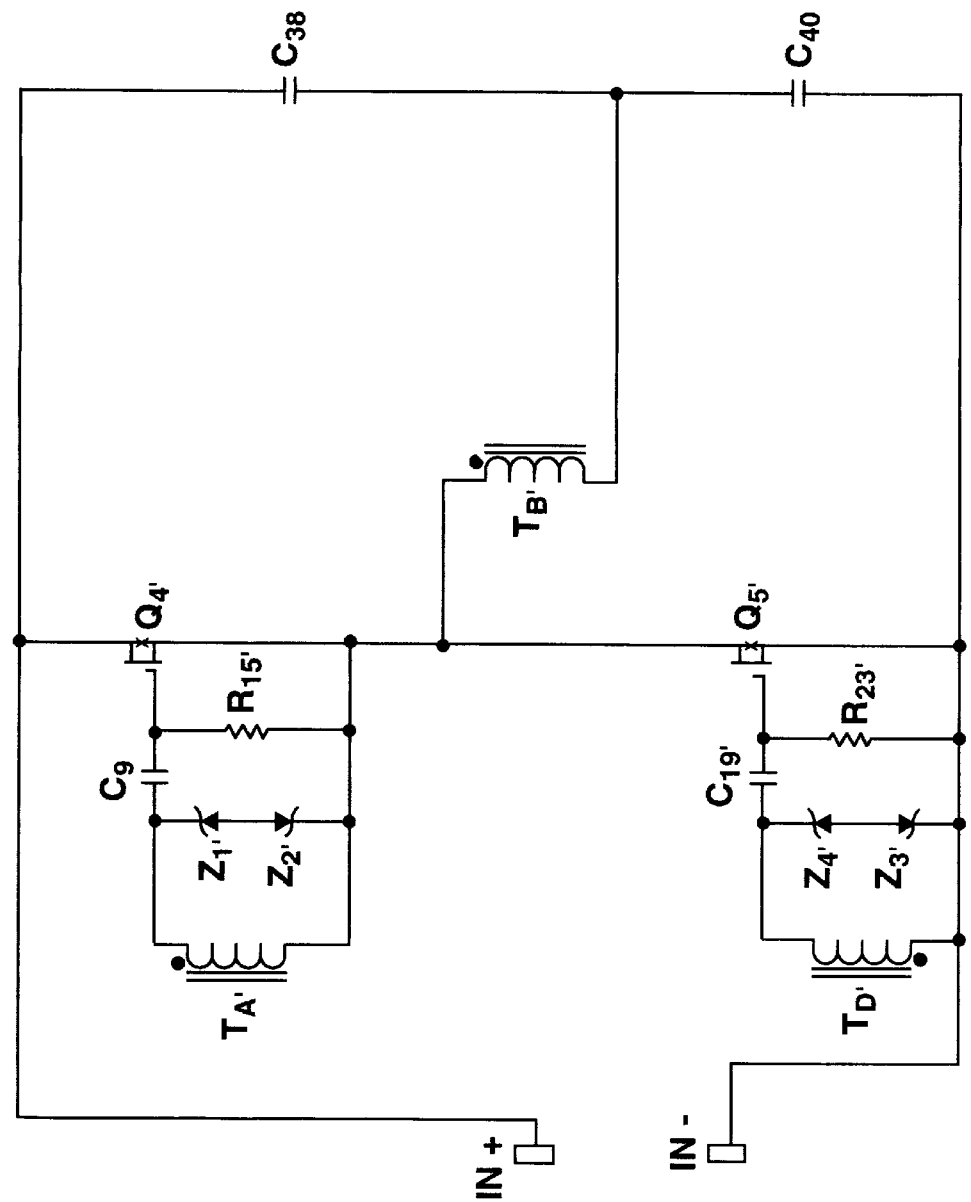
FIG. 13

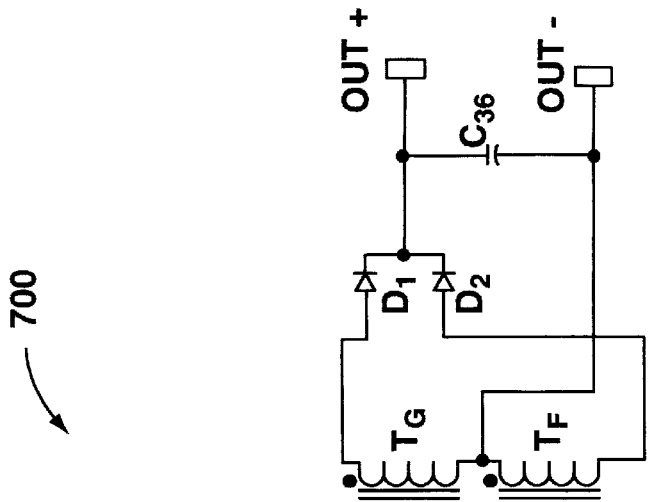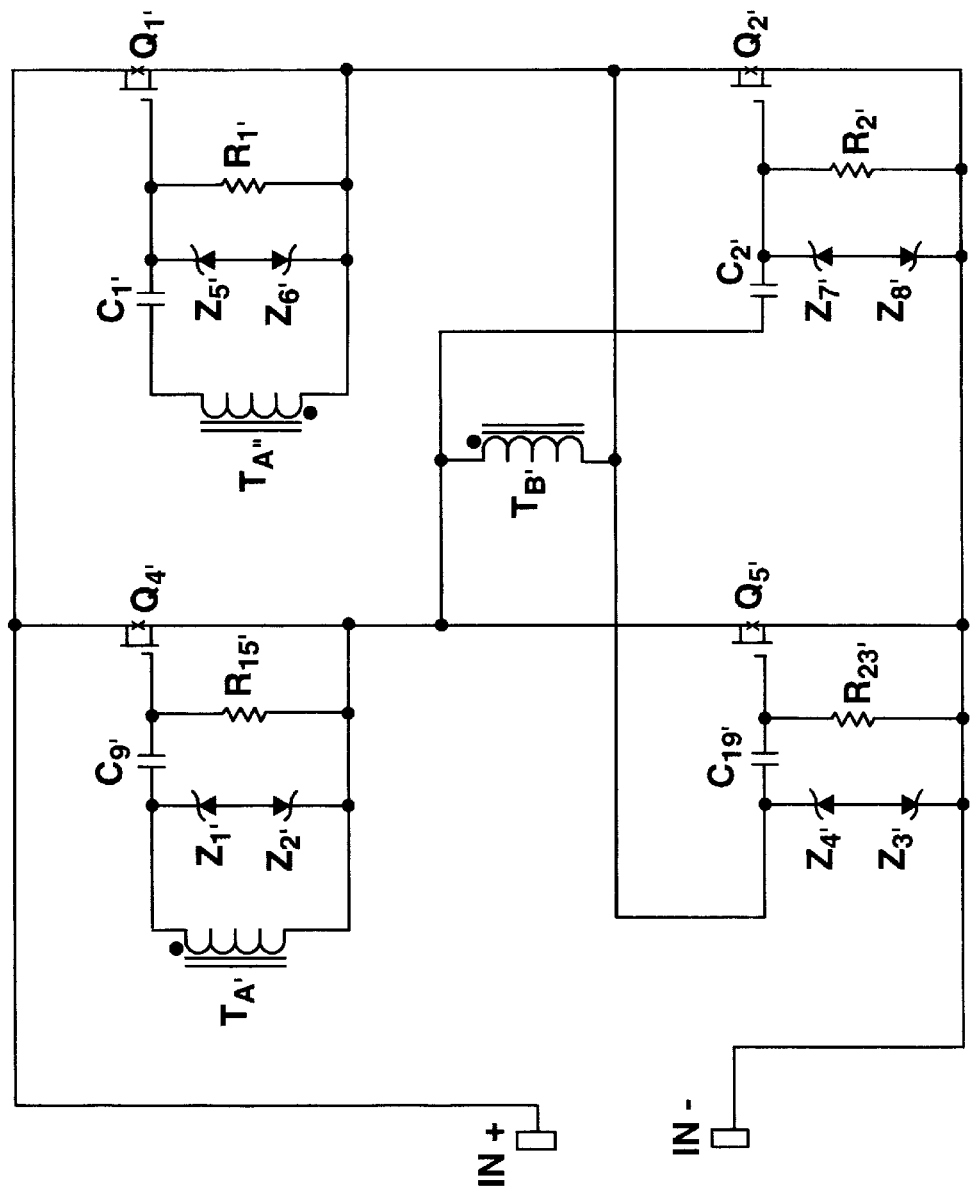
FIG. 14

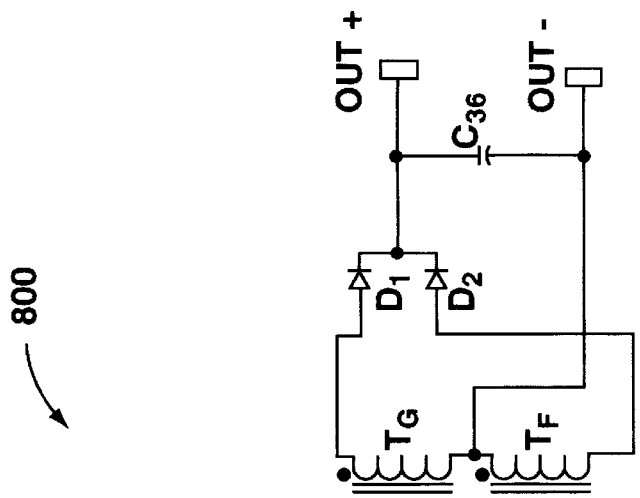
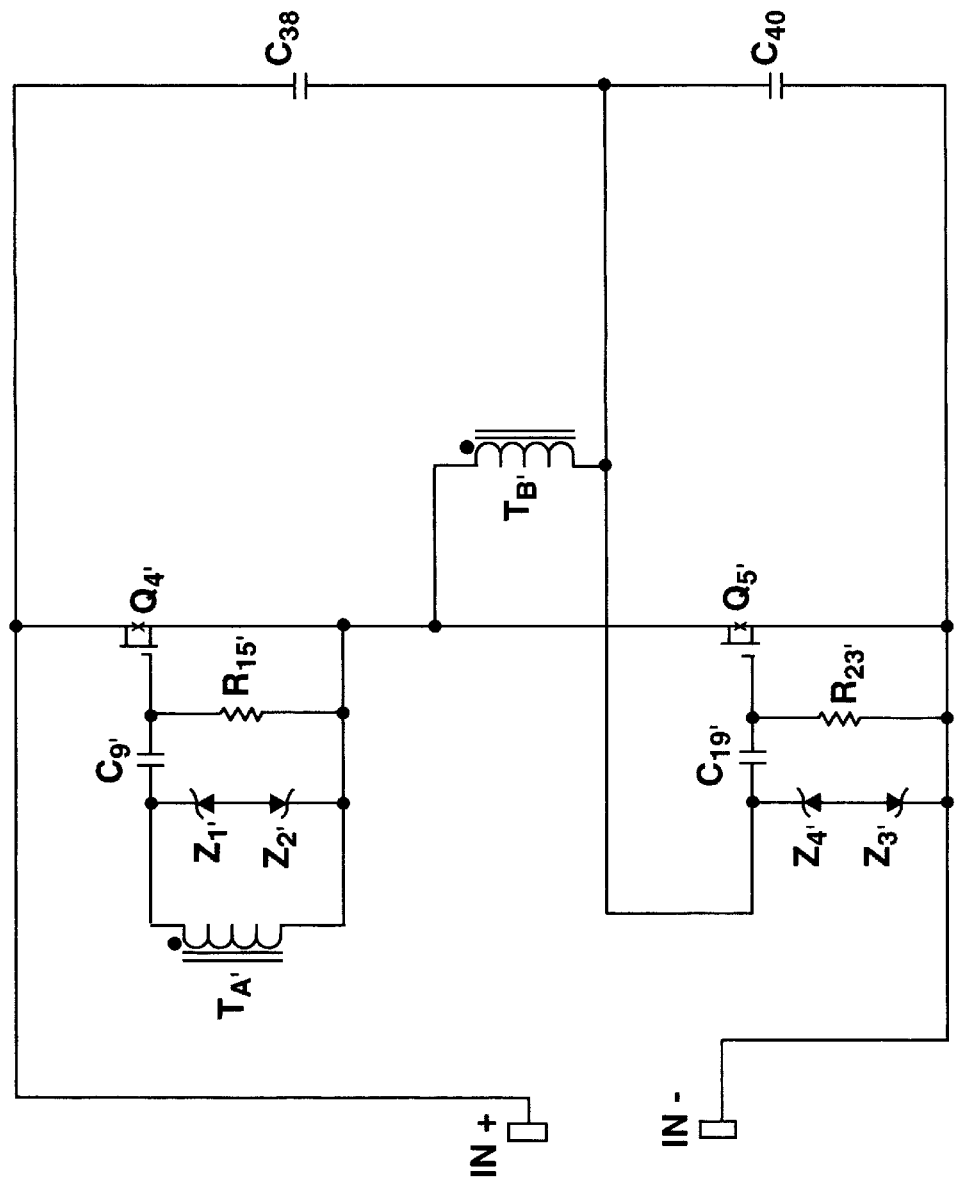
FIG. 15

DC POWER CONVERTER CIRCUIT

CROSS-REFERENCE TO PREVIOUS PROVISIONAL APPLICATION

This application claims the benefit of priority from U.S. Provisional Application No. 60/114,864, filed Jan. 6, 1999.

FIELD OF THE INVENTION

The present invention relates generally to self oscillating power converters and more particularly to an improved self oscillating circuit for power converters.

BACKGROUND OF THE INVENTION

As the number of electronic devices continue to multiply in residential and office environments, the adverse effects of electro-magnetic interference (EMI) noise from one piece of equipment on other nearby equipment are becoming more problematic. As a result, restrictions on permissable EMI levels produced by electronic devices are becoming more stringent which in turn is producing significant demand for high-efficiency power converters with appropriately reduced EMI emissions.

Forced oscillation converters are commonly used in high efficiency power supplies. This type of converter generally comprises an input rectifier and filter, high frequency inverter, control circuit and an output section. Typically, high frequency MOSFET switches are operated by varying duty cycle or frequency to maintain the output voltage at a desired level. The efficiency of such converters is limited by losses in the MOSFETs during turn-on and turn-off, particularly in pulse-width modulated (PWM) converters. Since the primary current of a power transformer is periodically interrupted by high voltage spikes, EMI is produced. In the case of balanced converters, it is difficult to achieve synchronized opening and closing of the MOSFET switches due to stray capacitances, inductance and noise, complex control circuity for providing properly formed and timed DC pulses is generally required. These conditions require the addition of numerous interference suppressor and protection circuits and result in increased converter size and complexity. Methods for reducing EMI for forced oscillation power converters include the use of snubbers, input filters as well as adoption of special control strategies. However, these methods further complicate the design process and appreciably increase production cost.

Self oscillating converters do not utilize as many components as forced oscillation converters and may not generate such high levels of EMI, however they suffer from switching speed limitations and power inefficiencies. Transformer coupled self oscillating converters are designed to trigger switching transistor turn-on and turn-off using either the saturation of the switching devices, saturation of the power transformer core, or saturation of an intermediate drive transformer. The technique of saturation switching transistors is limited to slower switching speeds and the energy required to fully saturate transformers causes power losses and results in compromised efficiencies.

Specifically, a longstanding type of self oscillating DC to DC converter is disclosed in U.S. Pat. No. 5,303,137 to Peterson. Peterson utilizes a MOSFET half-bridge configuration in which each transistor is alternately saturated. Once a transistor is saturated, current continues to flow in the transformer winding due to the magnetizing inductance of transformer and the reflected load current. This current discharges the voltage across a circuit capacitor to reduce the voltage across the primary winding, which in turn is coupled to the gate windings. As the current rises, the transistor comes out of saturation and turns itself on again causing a voltage drop to reappear across the transformer. However, since this switching technique relies on the transistor beta factor it cannot be implemented using MOSFETs and higher switching frequencies cannot be achieved.

Another type of self oscillating circuit drives transistor switches using the properties of core saturation, as described in U.S. Pat. No. 4,319,315 to Keeney, Jr. et al., where a DC to DC converter uses a saturable transformer having a center-tap and resistive network interposed among four sequentially operating transistors. The transistors cause one side of the input DC voltage to be sequentially applied to opposite sides of a primary winding of the transformer which, in turn, cause the transformer to be excited into positive and then negative saturation conditions. When the transformer core saturates, appropriate gate drive voltages collapse and the associated transistors switches are turned off. While core saturating transformer converters are simpler than forced oscillating converters, since the core must be fluxed from one end to another in order to fully saturate, significant power losses result and overall efficiency is reduced.

Finally, another type of self oscillating converter utilizes resonance effects within an oscillating circuit, such as the converter disclosed in U.S. Pat. No. 5,430,632 to Meszenyi where a pair of MOSFET transistors are configured in a half-bridge configuration and coupled to a reactive network. The frequency of oscillation is determined by the gate-to-source capacitance of the transistors and the inductance of the drive transformer. This resonance converter suffers from increased complexity, sensitivity to parasitics and emissions due to its high operating frequency.

Thus, there is a need for a self oscillating power converter which achieves conventional power efficiencies using a minimal number of parts, which generates a significantly reduced amount of EMI, which provides increased reliability, and which can be operated at slower switching speeds to further reduce EMI emissions.

BRIEF SUMMARY OF THE INVENTION

Accordingly, it is an object of the present invention to provide a relatively simple self-oscillating DC power converter circuit which oscillates at lower switching speeds to provide reduced EMI and has a non-saturating transformer to reduce power losses.

One embodiment of a circuit according to the present invention provides a DC output voltage which corresponds to a DC input voltage. The input DC voltage is alternately switched across a pair of primary windings of a transformer. A secondary output winding is coupled to each of the primary windings. A secondary voltage appears across each of the secondary output windings as the input DC voltage is switched across the corresponding primary winding. The secondary voltages are rectified and provide the DC output voltage. The DC output voltage corresponds to the input DC voltage, based on the turns ratio of the primary windings to the secondary output windings. The switching of the input DC voltage across the primary windings is controlled by alternately switching two MOSFET transistors. Each transistor is coupled to one primary winding so that a greater amount of the DC input voltage is seen across the corresponding primary winding as the transistor is turned on. When the transistor is fully on, essentially the entire input DC voltage is seen across the primary winding. The gate of each transistor is coupled to a gate drive winding which is transformer coupled to the primary winding controlled by the transistor. The transistor is turned on by charging its gate capacitance through the gate driving winding. As the transistor is turned on, the voltage across the primary winding increases, thereby increasing the voltage across the gate drive winding, which turns on the transistor at an increasingly accelerated rate. After the transistor has fully turned on, it is switched off by isolating the gate from the gate drive winding using a capacitor and discharging the gate capacitance through a discharge resistor. This turn off process is performed slowly to reduce EMI radiation.

The production of EMI is further diminished by transformer isolating both of the switching transistors from the secondary output windings, thereby allowing the transistors to be configured in a common drain configuration.

Power losses during the turn-off process are reduced by operating the transistor in a soft switching manner thereby reducing power dissipation.

These and other benefits of the present invention will appear from the following description.

BRIEF DESCRIPTION OF THE DRAWINGS

In the accompanying drawings:

FIG. 1 is a circuit diagram of a preferred push-pull embodiment of the self oscillating power converter of the present invention;

FIG. 2 is a graph showing the voltage across primary transformer windings $T_B$ and $T_C$;

FIG. 3 is a graph showing the gate voltage of a transistor $Q_4$ and across gate drive transformer winding $T_A$;

FIG. 4 is a graph showing the gate voltage of a transistor $Q_5$ and the voltage across gate drive transformer winding $T_D$;

FIG. 5 is a graph showing the gate voltage of transistor $Q_4$, current of transistor $Q_4$, and voltage across primary transformer winding $T_B$;

FIG. 6A is a graph showing the waveform characteristics of the gate voltage of transistor $Q_4$ when the power converter is operating in a balanced manner; and FIG. 6B is a graph showing the waveform characteristics of the gate voltage of transistor $Q_4$ during unbalanced operating conditions.

FIG. 8 is a circuit diagram of another embodiment of the self oscillating power converter of the present invention implemented as a common source push-pull power converter;

FIG. 10 is a circuit diagram of another embodiment of the self oscillating power converter of the present invention implemented as a capacitive coupled push-pull power converter;

FIG. 11 is a circuit diagram of another embodiment of the self-oscillation power converter of the present invention implemented as a hybrid transformer and capacitive coupled push-pull power converter;

FIG. 13 is a circuit diagram of another embodiment of the self-oscillation power converter of the present invention implemented as a transformer coupled half-bridge power converter;

FIG. 14 is a circuit diagram of another embodiment of the self-oscillation power converter of the present invention implemented as a hybrid transformer and capacitive coupled full-bridge power converter; and FIG. 15 is a circuit diagram of another embodiment of the self-oscillation power converter of the present invention implemented as a hybrid transformer and capacitive coupled half-bridge power converter.

DETAILED DESCRIPTION OF PREFERRED EMBODIMENTS

Figure 7:
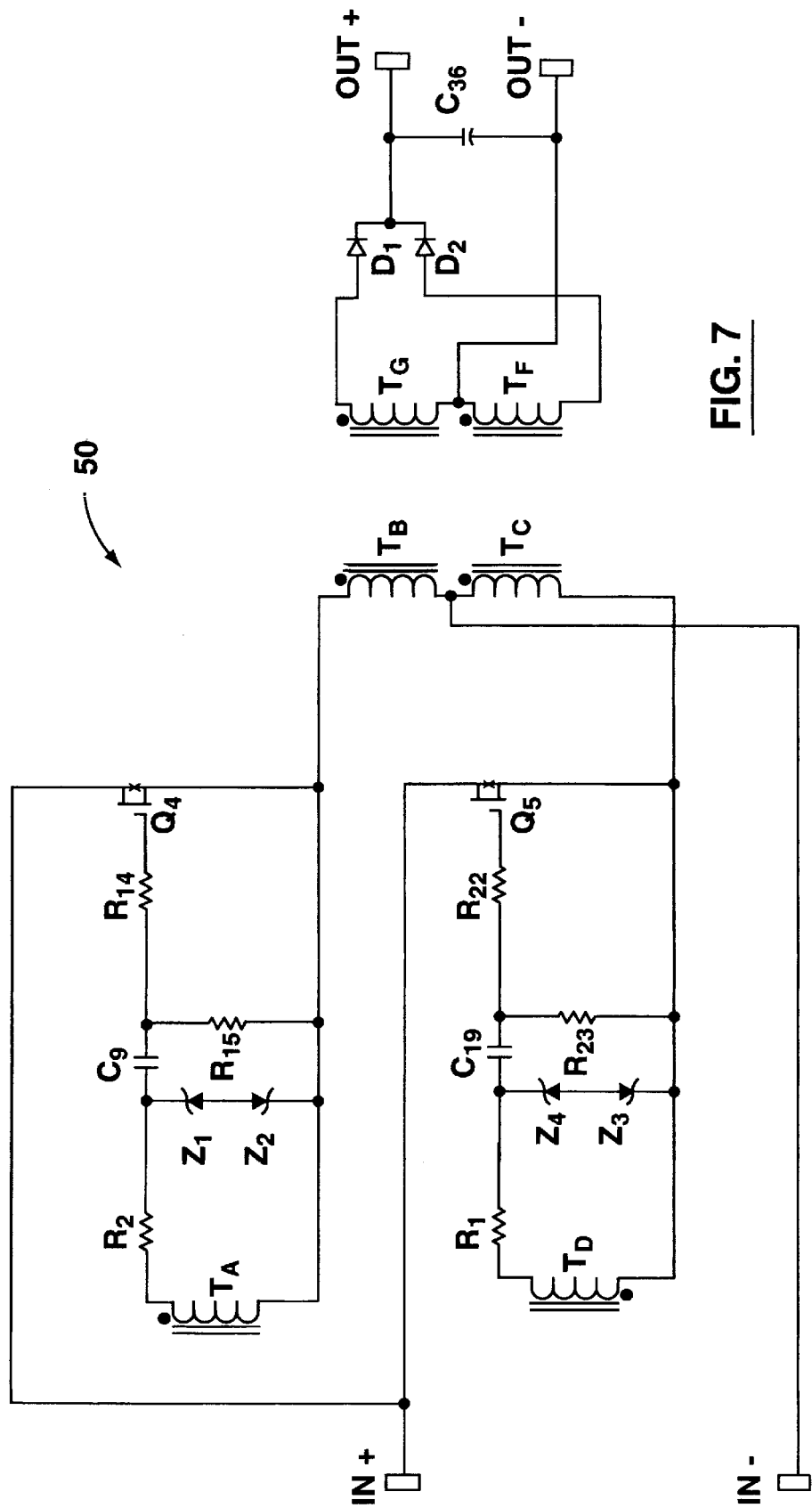
FIG. 7 is a circuit diagram of another embodiment of the self oscillating power converter of the present invention implemented to reduce the variation of the oscillation frequency when the load or input voltage is varied.

Reference is first made to FIG. 1, which a self oscillating power converter circuit 10 made in accordance with a first preferred embodiment of the invention. Power converter 10 is a push-pull converter which includes a starter circuit 12, a set of primary transformer windings $T_B$ and $T_C$, secondary transformer windings $T_G$ and $T_F$ and gate drive windings $T_A$ and $T_D$, MOSFET transistors $Q_4$ and $Q_5$, coupling capacitors $C_9$ and $C_{19}$, discharging resistors $R_{15}$ and $R_{23}$, damping resistors $R_2$ and $R_1$, gate stopper resistors $R_{14}$ and $R_{22}$, and zener diodes $Z_1$, $Z_2$, $Z_3$, and $Z_4$.

Starter circuit 12 preferably comprises capacitor $C_{20}$, resistors $R_{24}$ and $R_{25}$, diode $D_3$, and diac $Q_7$ as described in U.S. Pat. No. 5,430,632 to Meszlenyi. It should be understood that while this type of starting circuit is preferred due to its simplicity and low cost, many other well known starter circuits may be used to start power converter 10. Due to inevitable slight imbalances in component values (e.g. differences in the transistor characteristics of $Q_4$ and $Q_5$), it would even be possible to start the circuit simply by raising the DC voltage rapidly across the input of power converter 10.

Power converter 10 receives DC voltage across terminals IN+ and IN− from a DC source, such as a battery, an AC line power applied through a rectifier, an output stage of a power supply, or any time varying source having constant polarity. Power converter 10 uses primary windings $T_B$ and $T_C$ and secondary transformer windings $T_G$ and $T_F$ to isolate the source from the load. It should be noted that it is possible to have two or more sets of secondary windings so that a range of DC output voltages can be generated. Further, gate drive windings $T_A$ and $T_D$ are transformer coupled to primary windings $T_B$ and $T_C$ and drive the gates of transistors $Q_4$ and $Q_5$.

Drive windings $T_A$ and $T_D$ should be well-coupled to primary windings $T_B$ and $T_C$ (i.e. should have a coupling coefficient greater than 0.999). Further this coupling should be greater than the coupling between gate drive winding $T_A$ and secondary windings $T_G$ or $T_F$, and between gate drive winding $T_D$ and secondary windings $T_G$ or $T_F$ (as secondary windings $T_G$ and $T_F$ could themselves be coupled). This can be achieved by winding the gate drive windings $T_A$ and $T_D$ first, winding primary windings $T_B$ and $T_C$ on top of the gate drive windings and then winding secondary windings $T_F$ and $T_G$ on top in order to preserve the coupling between primary and second windings and associated load regulation. Such coupling ensures that the gate drive windings $T_A$ and $T_D$ will be able to reliably drive the gates of transistors $Q_4$ and $Q_5$ such that oscillation is preserved and to guard against device failure due to circuit instability, leakage inductance and ringing currents.

While transistors $Q_4$ and $Q_5$ are preferably implemented as n-channel MOSFETs, it should be understood that any type of switching element such as p-channel MOSFETs, JFETs, BJTs or IGBTs (either p-channel or n-channel) may be used. Because the gates of transistors $Q_4$ and $Q_5$ are transformer isolated, transistors $Q_4$ and $Q_5$ can be operated in a common drain configuration. That is, the drains of transistors $Q_4$ and $Q_5$ can be tied together to a fixed DC voltage at node IN+ which results in a self-shielding configuration which screens the noise from the rapidly moving source, as will be explained.

The gates of transistors $Q_4$ and $Q_5$ are coupled to gate drive windings $T_A$ and $T_D$ by capacitors $C_9$ and $C_{19}$ and connected through resistors $R_{14}$ and $R_{22}$, respectively. In turn, capacitors $C_9$ and $C_{19}$ are coupled to primary windings $T_B$ and $T_C$ through resistors $R_{15}$ and $R_{23}$, respectively. This allows the voltage across gate drive windings $T_A$ and $T_D$ to rise through capacitor $C_9$ or $C_{19}$ and to dissipate through resistor $R_{15}$ or $R_{23}$, respectively towards the voltage across primary windings $T_B$ and $T_C$ (depending the polarity of the respective windings). The values of capacitors $C_9$, $C_{19}$ and resistors $R_{15}$ and $R_{23}$ should be scaled to allow for reasonable power dissipation, as well as reasonable changes in switching speed and frequency due to load variation.

Damping resistors $R_2$ and $R_1$ are coupled between gate drive windings $T_A$ and $T_D$ and capacitors $C_9$ and $C_{19}$, respectively. The use of appropriate values of resistors $R_2$ and $R_1$ together with adjustment of the transformer turns ratio, can serve to stabilize the operation of power converter 10 in an overload situation and to ensure that sufficient gate drive is provided to transistors $Q_4$ and $Q_5$ for full load operation.

Gate stopper resistors $R_{14}$ and $R_{22}$ are used to damp very high frequency oscillations (on the order of 100 MHz) and are a conventionally known circuit precaution when using MOSFETs. Resistors $R_{14}$ and $R_{22}$ create a low pass filter with the gate of the transistors $Q_4$ and $Q_5$ which damps out parasitic instability while at the same time providing sufficient current to drive the gate voltage fast enough.

Zener diode pairs $Z_1/Z_2$ and $Z_3/Z_4$ are used to clamp the maximum voltage on the gate of transistors $Q_4$ and $Q_5$ to safe limits. While this effect could be achieved using a single zener diode, the use of a pair of zener diodes preserves the self-balancing aspect of the oscillator.

When a DC voltage is applied across terminals IN+ and IN−, starter circuit 12 of power converter 10 operates to start power converter 10 as follows. Capacitor $C_{20}$ starts to charge with the voltage at terminal IN+ through resistor $R_{24}$. As capacitor $C_{20}$ is charging, the voltage applied to diac $Q_7$ will increase. Once the applied voltage exceeds its breakdown voltage, diac $Q_7$ will begin to conduct current, causing current to flow through resistor $R_{25}$, diode $D_3$, diac $Q_7$ and through resistor $R_{14}$ into the gate of transistor $Q_4$. That is, the voltage across capacitor $C_{20}$ will be applied to the gate of transistor $Q_4$. When the voltage on the gate of transistor $Q_4$ rises above the turn-on threshold, transistor $Q_4$ will start to turn on. Diode $D_3$ is a blocking diode which guarantees that diac $Q_7$ will not inadvertently refire.

Once transistor $Q_4$ begins to conduct, the DC voltage across the IN+ and IN− terminals will be applied directly across primary winding $T_B$. Since primary winding $T_B$ is transformer coupled to winding $T_A$, gate drive winding $T_A$ will begin to produce a corresponding voltage having a positive polarity (as indicated by the dot). As the voltage across winding $T_B$ increases, the voltage across $T_A$ will also increase and will cause increased current to flow through resistor $R_2$, capacitor $C_9$ and resistor $R_{14}$ to the gate of transistor $Q_4$. Since the increasingly positive voltage across gate drive winding $T_A$ is applied across the gate-source junction of transistor $Q_4$, transistor $Q_4$ will continue to be turned on. This will further increase the voltage across primary winding $T_B$ and gate drive winding $T_A$. This positive feedback dynamic serves to turn on transistor $Q_4$ in an accelerating (or regenerative) manner. As gate drive winding $T_D$ has reverse polarity to winding $T_A$, when positive DC voltage is applied to winding $T_B$, a negative DC voltage will appear across winding $T_D$ (at the end opposite to the dot). Since a negative voltage is applied across the gate-source junction of the transistor $Q_5$, transistor $Q_5$ will continue to turn off also in a regenerative manner. This process will continue until transistor $Q_4$ is fully on and transistor $Q_5$ is fully off. Here, in effect regenerative feedback is applied to both transistors $Q_4$ and $Q_5$ causing one to turn on and one to turn off.

Once transistor $Q_4$ is fully on, the full rated DC voltage will appear across primary winding $T_B$ and this DC voltage will remain constant as long as transistor $Q_4$ is fully on. At this point, the voltage across the gate capacitance of transistor $Q_4$ will begin to discharge through resistor $R_{15}$. The voltage on the gate of transistor $Q_4$ will also be discharged until a turn-off threshold is reached whereby transistor $Q_4$ starts to turn off. Simultaneously, the gate capacitance of transistor $Q_5$ begins to charge up towards ground through resistor $R_{23}$. Once transistor $Q_4$ starts to turn off, the turn-over process of power converter 10 is initiated and transistor $Q_5$ will start to turn on, the details of which will be described further in relation to the voltage and current characteristics of power converter 10 below.

By alternately turning transistors $Q_4$ and $Q_5$ of power converter 10 on and off, the DC voltage across IN+ and IN− is alternately applied across primary windings $T_B$ and $T_C$. Voltages appear across secondary windings $T_G$ and $T_F$ in accordance with the primary/secondary winding ratio. These voltages are rectified by output stage diodes $D_1$ and $D_2$ as is conventionally known. The rectified voltage output is applied across capacitor $C_{36}$ which provides DC voltage output of power converter 10 across terminals OUT+ and OUT−. It is evident that power converter 10 cannot be regulated in one stage using conventional means such as PWM or frequency modulation.

FIGS. 2, 3, 4 and 5 together show a number of voltage and current characteristics of transistors $Q_4$ and $Q_5$, primary windings $T_B$ and $T_C$ and gate drive windings $T_A$ and $T_D$ which result when power converter 10 receives a 160 volt DC input at terminals IN+ and IN−, has a turns ratio of $T_A$ to $T_B$ (and of $T_D$ to $T_C$) of 1:6 and has components with the following values:

| Designation | Description (or Part No.) | Designation | Description (or Part No.) |
|---|---|---|---|
| $C_{20}$ | 3300 pF | $D_1$ | MUR1620CT |
| $R_{24}$ | 100 kΩ | $D_2$ | MUR1620CT |
| $R_{25}$ | 475 Ω | $C_{36}$ | 470 µF |
| $D_3$ | 1N 414β | | |
| $Q_7$ | diac | | |
| $R_2$ | 220 Ω | $R_1$ | 220 Ω |
| $C_9$ | 2200 pF | $C_{19}$ | 2200 pF |
| $Z_1$ | 1N5250 | $Z_3$ | 1N5250 |
| $Z_2$ | 1N5250 | $Z_4$ | 1N5250 |
| $R_{14}$ | 22 Ω | $R_{22}$ | 22 Ω |
| $R_{15}$ | 475 Ω | $R_{23}$ | 475 Ω |
| $Q_4$ | IRF740 | $Q_5$ | IRF740 |

FIG. 2 shows the voltages across primary windings $T_B$ and $T_C$ which result when transistors $Q_4$ and $Q_5$ are alternately turned on and off. At point A, the voltages across both primary windings $T_B$ and $T_C$ are at that instant zero. At point A, both gate voltages of transistors $Q_4$ and $Q_5$ ($V_{Q4}$ and $V_{Q5}$) are zero and neither transistor is conductive which causes zero voltage to be applied to primary windings $T_B$ and $T_C$. As will be explained, between point A and point C, the gate voltage $V_{Q4}$ of transistor $Q_4$ starts to rise (either from being started by starting circuit 12 or during normal oscillation), transistor $Q_4$ turns on, and the gate voltage of transistor $Q_5$ starts to fall and transistor $Q_5$ turns off. As transistor $Q_4$ turns on, the DC voltage from terminals IN+ and IN− starts to be applied across primary winding $T_B$ (FIG. 2). As transistor $Q_5$ turns off, the DC voltage from terminals IN− and IN+ starts to be applied across primary winding $T_C$ (FIG. 2). It should be noted that once transistors $Q_4$ and $Q_5$ are fully on and off, respectively, the voltages across windings $T_B$ and $T_C$ stay constant (i.e. between points C and D) in spite of non-threshold level variations in gate voltage.

FIG. 3 shows the voltage across gate drive winding $T_A$ and the gate voltage $V_{Q4}$ of transistor $Q_4$. The gate voltage $V_{Q4}$ of transistor $Q_4$ is shown to increase from point A to C (after starting) which in turn causes the voltage across primary winding $T_B$ (FIG. 2) to increase as has been discussed. The voltage across gate drive winding $T_A$ (FIG. 3) also increases from point A to point C according to the appropriate turns ratio. The increased voltage across winding $T_A$ accelerates the increase of the gate voltage of transistor $Q_4$ from point B to C and accordingly the gate voltage $V_{Q4}$ of transistor $Q_4$ will follow the voltage increase across winding $T_A$ with a slight delay due to the presence of the input capacitances of transistors $Q_4$ and $Q_5$ and resistors $R_2$ and $R_{14}$. The voltage on the gate of transistor $Q_4$ is driven to a peak voltage value which is limited by zener diodes $Z_1$ and $Z_2$.

FIG. 4 shows the voltage across gate drive winding $T_D$ and the gate voltage $V_{Q5}$ of transistor $Q_5$. The gate voltage of transistor $Q_5$ is shown to decrease from point A to C which in turn causes the voltage across primary winding $T_C$ (FIG. 2) to decrease as has been discussed. The voltage across gate drive winding $T_D$ (FIG. 3) also decreases from point A to point C according to the appropriate turns ratio. The voltage across winding $T_D$ drives the gate of transistor $Q_5$ and accordingly the gate voltage of transistor $Q_5$ will follow the voltage decrease across winding $T_D$ with a slight delay due to the presence of capacitor $C_{19}$ and resistors $R_1$ and $R_{22}$. The voltage on the gate of transistor $Q_5$ is driven down to a low voltage value which is limited by zener diodes $Z_3$ and $Z_4$.

Now referring back to FIGS. 1, 2, 3 and 4, between points A and B, the voltage across gate drive winding $T_A$ and gate voltage $V_{Q4}$ of transistor $Q_4$ (FIG. 3) gradually increase. Between points B and C, the voltages across primary winding $T_B$ (FIG. 2) and gate drive winding $T_A$ (FIG. 3) increase faster than they did between points A and B. This is due to the fact that the voltage across gate drive winding $T_A$ adds to the gate voltage $V_{Q4}$ of transistor $Q_4$ which in turn increases the rate that transistor $Q_4$ turns on. Between points B and C, the slope of the voltage of gate voltage $V_{Q4}$ is less than its slope between points A and B. When transistor $Q_4$ is driven by a finite source impedance, the miller capacitance must be charged through the resistances of the circuit, as is conventionally known in respect of MOSFET transistors. This increases the rate at which DC voltage IN+ and IN− is applied to primary winding $T_B$ all in an accelerating manner.

An analogous dynamic occurs with respect to primary winding $T_C$ (FIG. 2) and gate drive winding $T_D$ (FIG. 4) in that these voltages both decrease in an increasingly rapid manner between points B and C than between points A and B. In this case, between points B and C increasingly negative voltage is applied across gate drive winding $T_D$ which serves to increase the rate that the transistor $Q_5$ turns on. This increases the rate at which DC voltage IN− and IN+ is applied to primary winding $T_C$. Between points B and C, the slope of the voltage of gate voltage $V_{Q5}$ is less than its slope between points A and B. When transistor $Q_4$ is driven by a finite source impedance, the miller capacitance must be discharged through the resistances of the circuit, as is conventionally known in respect of MOSFET transistors.

Referring still to FIGS. 2, 3 and 4, between points C and D, the voltages across gate drive winding $T_A$ and primary winding $T_B$ (and correspondingly gate drive winding $T_D$ and primary winding $T_C$) remain constant as long as transistor $Q_4$ remains fully on (and as long as transistor $Q_5$ is fully off). Accordingly, these voltages will be independent of the gate voltages of transistors $Q_4$ and $Q_5$ "voltages of transistors $Q_4$ and $Q_5$", add "and capacitor $C_9$ will have a DC voltage across it and accordingly will be discharged. Capacitor $C_9$ will act as an open circuit, effectively isolating the gate of transistor $Q_4$ from gate drive winding $T_A$". After the gate voltage $V_{Q4}$ of transistor $Q_4$ reaches its peak voltage (FIG. 3), resistor $R_{15}$ provides a discharge path for the gate capacitance of transistor $Q_4$. Accordingly, the gate of transistor $Q_4$ will begin to discharge to ground at terminal IN− through resistor $R_{15}$ and the gate voltage $V_{Q4}$ of transistor $Q_4$ (FIG. 3) will exhibit a declining ramp characteristic from points C to D. The voltage at the node between capacitor $C_9$ and resistor $R_1$ will display a corresponding declining ramp characteristic and capacitor $C_9$ will also be charged as a result of the voltage across it. This continues until transistor $Q_4$ starts to turn off at point D.

At point D, transistor $Q_4$ starts to turn off causing a voltage drop across transistor $Q_4$ to begin to develop which in turn causes the voltage across primary winding $T_B$ to begin to decrease (FIG. 2). Accordingly, the voltage on gate drive winding $T_A$ will follow the voltage across the primary winding $T_B$ and also start to drop (FIG. 3) according to its winding ratio.

At point E, gate voltage $V_{Q4}$ of transistor $Q_4$ reaches a threshold value and transistor $Q_4$ begins to come out of its saturation state. As the voltage drop across transistor $Q_4$ substantially increases, the voltages across primary winding $T_B$ and gate drive winding $T_A$ continue to decrease. Subsequently, the gate voltage $V_{Q4}$ of transistor $Q_4$ begins to rapidly drop due to the effect of rapidly decreasing gate voltage as a result of decreasing voltage across gate drive winding $T_A$. At this point, the only currents flowing in transistor $Q_4$ are associated circuit magnetization and leakage inductance currents which serve to drive transistor $Q_4$ completely off and transistor $Q_5$ fully on. As the voltage drops across winding $T_B$ between points D and E, the voltage across the reverse dotted transformer coupled gate drive winding $T_D$ correspondingly starts to rise. Accordingly, at point D, capacitor $C_{19}$ begins to charge up with the voltage across gate drive winding $T_D$ and applies voltage to the gate of transistor $Q_5$. The process described above in relation to transistor $Q_4$ repeats in respect of transistor $Q_5$, and turn-on of transistor $Q_5$ is accelerated between points E to F as transistor $Q_5$ begins to saturate and turn on.

Finally, as previously discussed, just after point F the gate voltage $V_{Q4}$ of transistor $Q_4$ (FIG. 3) again experiences a small characteristic voltage step commonly associated with MOSFET's. This wiggle is due to the charging of the miller capacitance of transistor $Q_4$ through the resistances of the circuit. Specifically, just after point F on FIG. 3, the miller capacitance of transistor $Q_4$ is being discharged and just after point F on FIG. 4, the miller capacitance of transistor $Q_5$ is being charged.

In this way, a slow turn off process is achieved for transistor $Q_4$ between points D and E (and correspondingly for transistor $Q_5$ at analogous points). Traditionally, it has been thought that when a transistor experiences a slow turn-off, significant dissipative power losses are inevitable. However, the inventor has discovered that as the gate voltage $V_{Q4}$ of transistor $Q_4$ decreases between points D and E (FIG. 3) the current flowing through transistor $Q_4$ essentially stops due to current conditions present in winding $T_G$, as will be explained below.

Now referring to FIG. 5, the current $I_{Q4}$ and the gate voltage $V_{Q4}$ of transistor $Q_4$ are shown. It should be noted that current $I_{Q4}$ is zero between points D and E. Between points D and E, the transconductance of transistor $Q_4$ decreases. That is, as transistor $Q_4$ becomes more resistive, a voltage drop across transistor $Q_4$ will be produced. That in turn will mean that the voltage across primary winding $T_B$ will be reduced. Since there is an existing voltage across output terminals OUT+ and OUT−, any drop in voltage across winding $T_B$, however slight, will cause the voltage across winding $T_G$ to decrease below the voltage which exists across capacitor $C_{36}$ (or across terminals OUT+ and OUT−). Once this voltage differential is established, rectifiers $D_1$ and $D_2$ will stop current flow in the output stage.

Since the current flowing through winding $T_G$ is reflected in primary winding $T_B$, the only currents left flowing through primary winding $T_B$ will be the magnetization and leakage inductance currents that were previously flowing within the transformers and the ringing and parasitic parts of the circuit. Thus, as long as there is an amount of voltage across transistor $Q_4$ between points D and E, current will not flow through transistor $Q_4$ as is shown between points D and E in FIG. 5. This means that transistor $Q_4$ essentially operates in a high impedance state during switch transitions. As the analogous condition exists in respect of transistor $Q_5$, both transistors $Q_4$ and $Q_5$ of power converter 10 assume a high impedance states during switching transitions which results in very low overall power dissipation.

Accordingly, power converter 10 provides comparable efficiency to that of conventional forced oscillating power converters due to its inherent efficiency of operation while achieving softer switching characteristics.

Further, since power converter 10 provides a soft switching characteristic, a significant reduction in the amount of radiated EMI is achieved. In the example implementation of the common-drain self oscillating power converter 10, the radiated EMI associated with power converter 10 was determined to be 40 dB less than the radiated EMI generated by a typical forced oscillation power converter. This reduction in EMI emissions can be explained by two phenomena.

First, since the voltage across transistor $Q_4$ drops as the transistor $Q_5$ is turned on and vice versa, minimal ringing is caused in the circuit and leakage spikes are avoided. Further, the slow rise and fall time voltage waveforms generate less radiated noise and since leakage inductance is not forced to stop suddenly, minimal ringing transients are produced. As previously discussed, the energy generally produced by leakage inductance is often recovered by adding in extra components which adds to the complexity of the circuit. In the present case, such measures are not required.

Second, since transistors $Q_4$ and $Q_5$ are transformer isolated from secondary windings $T_F$ and $T_G$, they can be configured in a common drain configuration. As is conventionally known, if the voltage on the drain moves rapidly, the voltage on the large surface area of the transistor tab changes rapidly causing radiation of EMI noise. In addition, since the drain is physically close to the heat sink, it is capacitively coupled to the heat sink and radiates to the heat sink, causing more radiation of EMI. In a common drain configuration, the voltage on the drains (the tabs of the transistors) will be stationary and coupled to the heat sink. Since the sources are physically separated from the heat sink by the drains (having a larger surface area than the sources), a self-shielding effect is produced. It should be noted that self-oscillating power converters generally have a common-source configuration in which the drain (on which voltage is moving) provides a long path for the high-frequency current and accordingly couples EMI noise to the circuit. In contrast, switching transistors $Q_4$ and $Q_5$ of power converter 10 are self-shielding and significantly reduce circuit radiated EMI.

A typical balanced power converter contains circuit imbalances which can lead to inefficient or destructive switching conditions. Forced oscillation power converters attempt to compensate for circuit inequalities by either forcing a switching transistor on longer or shorter than the other switching transistor. If one transistor is left on longer than another then there is a period where all the circuit currents and voltages are forced to stop. If one transistor is left on shorter than another then there is a period of time where both transistors will be on which can lead to destruction of the circuit. In contrast, the self oscillating dynamic allows each transistor to switch at its own speed which results in optimal right turn-on and turn-off current and voltage characteristics and a soft switch dynamic. While it is conventionally known that slow switching generally causes a high amount of power dissipation, the soft switching achieved by power converter 10 generates low power dissipation due to zero transistor currents during switching transitions.

Power converter 10 also exhibits self-balancing behaviour which prevents destructive core saturation. Typical push-pull converters must maintain a zero DC component across each half-winding (otherwise flux density builds in the transformer). When the on-time and off-time of switching transistors are not exactly equal, increased volt seconds will tend to build up across one of the two winding with each cycle. This will result in an increase in core flux until the core finally saturates.

FIG. 6A illustrates the gate voltage of transistor $Q_4$ of power converter 10 under balanced conditions where the on-time and off-time of transistors $Q_4$ and $Q_5$ are equal. Accordingly, the average voltage will be zero. Since gate drive windings $T_A$ and $T_D$ are transformer coupled, no net DC voltage can be generated and thus the average voltage on each gate drive winding must be zero. If the on-time and off-time of transistors $Q_4$ and $Q_5$ are unequal (FIG. 6B) then non-equal volt seconds will tend to shift the DC operating point of the gate drive voltage waveforms in the negative direction such that the volts seconds across the gate drive windings $T_A$ and $T_D$ will re-equalize. In the case shown in FIG. 6B, the resulting gate voltage $V_{Q4}$ will result in transistor $Q_4$ turning off sooner to rebalance power converter 10.

As an illustration, if resistor $R_{15}$ has a larger value than $R_{23}$, then it will take longer to discharge capacitor $C_9$ than it will to discharge capacitor $C_{19}$. Thus, the on-time for $Q_4$ will be longer than the on-time for $Q_5$. Thus, the voltage at the gate of transistor $Q_4$ (or the voltage across gate drive winding $T_A$) can be represented by the waveform of FIG.

6B. Due to the fact that the circuit is AC coupled (through capacitors $C_9$ and $C_{19}$), the areas under the voltage waveform must be equal. Therefore, resistor $R_{15}$ will have to discharge $C_9$ and the gate capacitance of transistor $Q_4$ less to reach the transistor turn-off threshold as the threshold voltage for transistor $Q_4$ will be lowered (see FIG. 6B). Thus, even if transistor $Q_4$ starts off being on longer than transistor $Q_5$, the circuit will rapidly rebalance itself. This feature is important, since in practice, there are many small circuit parameters which can cause a circuit imbalance (such as the values of the capacitors and resistors, the leakage inductance of windings $T_A$ and $T_D$, etc.)

Finally, a built-in safety feature prevents damage of power converter 10 due to core saturation (due to improper design parameters, inappropriately slow switching frequencies, etc.) In the case where the core begins to saturate, the voltage on the appropriate gate drive winding $T_A$ or $T_D$ will rapidly drop. This will initiate turnoff of transistor $Q_4$ or $Q_5$ and turnon of the complimentary transistor, which will alleviate the core saturation.

Referring now to FIG. 7, a second exemplary self oscillating power converter circuit 50, made in accordance with the present invention. This circuit contains identical components to those of power converter 10 of FIG. 1 and they are identified as such. While starting circuit 12 is not shown, it should be understood that starting circuit 12, or any equivalent circuit, could be implemented within power converter 50 as before. The only difference between power converter 50 and power converter 10 is that coupling capacitor $C_9$ has been moved and is now coupled between zener diode $Z_1$ and resistor $R_{14}$. Coupling capacitor $C_{19}$ is similarly coupled between zener diode $Z_4$ and resistor $R_{22}$.

In power converter 10, the oscillating frequency will vary, depending on the load coupled at terminals OUT+ and OUT−. A higher load will result in a lower voltage across gate drive winding $T_A$ (and across gate drive winding $T_D$). This will in turn result in a lower voltage across coupling capacitor $C_9$, which will have a commensurately lower charge on it. Coupling capacitor will discharge more quickly through resistor $R_{15}$, as described above (between points C and D in FIGS. 2–5). Transistor $Q_4$ will begin to turn off earlier (i.e. point D will occur sooner), and the oscillating frequency of power converter 10 will be higher. Coupling capacitor $C_{19}$, resistor $R_{23}$ and transistor $Q_5$ will exhibit the same behaviour during the other half of the oscillation cycle of power converter 10.

In power converter 10, the oscillating frequency also has an inverse relationship to the magnitude of the input DC voltage across terminals IN+ and IN−. A greater input DC voltage will result in a greater voltage across primary winding $T_B$ when transistor $Q_4$ is conducting and across primary winding $T_C$ when transistor $Q_5$ is conducting. This will in turn result in a greater voltage across gate drive windings $T_A$ and $T_D$, with the opposite effect to that described above in the case of an increased load.

In power converter 50, the dependency of oscillating frequency on both the load and the input DC voltage is diminished by using zener diodes $Z_1$ and $Z_2$ to clamp the voltage across gate drive winding $T_A$. This essentially fixes the maximum voltage across coupling capacitor $C_9$, substantially reducing the effects of varying either the load or the input DC voltage.

To enjoy the benefit of this improvement, zener diodes $Z_1$ and $Z_2$ and the turns ratio of $T_A$ to $T_B$ must be selected to ensure that zener diode $Z_1$ is reverse biased (i.e. it is operating in its breakdown region). The capacitance of capacitor $C_9$ must also be increased to compensate for the reduced drive voltage across it. This improvement also allows the resistance of damping resistor $R_2$ to be increased, resulting in lower power dissipation in power converter 50 and increasing the stabilizing effect of the resistor. It will be apparent that similar components selections must be selected for zener diodes $Z_3$ and $Z_4$, coupling capacitor $C_{19}$ and damping resistor $R_1$ to retain the balanced operation of power converter 50.

The inventor has found that selecting components with the following values provides a suitable operation for power converter 50:

| Designation | Description |
| --- | --- |
| $Z_1$ | 12 volt |
| $Z_2$ | 12 volt |
| $Z_3$ | 12 volt |
| $Z_4$ | 12 volt |
| R1 | 475 Ω |
| $R_2$ | 475 Ω |
| $C_9$ | 4700 pF |
| $C_{19}$ | 4700 pF |

The remaining components of power converter 50 may be identical to those previously listed for power converter 10. The inventor has found that the same turns ratio of $T_A$ to $T_B$ of 1:6 provides suitable results when the input DC voltage is 160 volts (as before). Analogous voltage and current characteristics will be generated by power converter 50 as were discussed in respect of power converter 10. Accordingly, the benefits of efficiency and self-balancing apply equally to power converter 50, as previously discussed. In addition, power converter 50 has the same common-drain configuration as power converter 10 and will share the benefits of EMI reduction of power converter 10.

Referring now to FIG. 8, a common source push-pull power converter 100 is shown. This circuit contains identical components to those of power converter 50 of FIG. 7 and they are identified as such. The main difference between power converter 100 and power converter 50 of FIG. 7, is that transistors $Q_4$ and $Q_5$ of power converter 100 have a common-source configuration, as is conventionally understood. That is, the sources of transistors $Q_4$ and $Q_5$ are tied together to terminal IN−.

Once power converter 100 is started and transistor $Q_4$ starts to turn on, the voltage across IN− and IN+ will be applied across primary winding $T_B$. This in turn will generate a positive voltage across gate drive winding $T_A$ (on the end opposite to the dot) which will, in turn serve to further drive on the gate of transistor $Q_4$. This increasing positive voltage is applied across the gate-source junction of transistor $Q_4$ which increases the rate at which transistor $Q_4$ turns on. Simultaneously, a negative voltage will be generated across gate drive winding $T_D$ (with respect to the dot) which will further drive transistor $Q_5$ off. Analogous voltage and current characteristics will be generated by power converter 100 as were discussed in respect of power converter 10. Accordingly, the benefits of efficiency and self-balancing apply equally to power converter 100, as previously discussed.

However, since power converter 100 does not have the self-shielding benefits of a common-drain configuration, the benefits of EMI reduction of power converter 10 are not shared by power converter 100. As previously mentioned, the drains are the tabs of the transistors (which have a physically large surface area). Since there is fast moving voltage on the drains and since the drains are capacitively coupled directly to the heat sink, a high frequency current is generated which circulates within the circuit. This high frequency current travels through a lengthy circuit path and represents a significant EMI radiation source. However, it should be noted that EMI reductions could still be realized within power converter 100 by using p-channel transistor devices.

Figure 9:
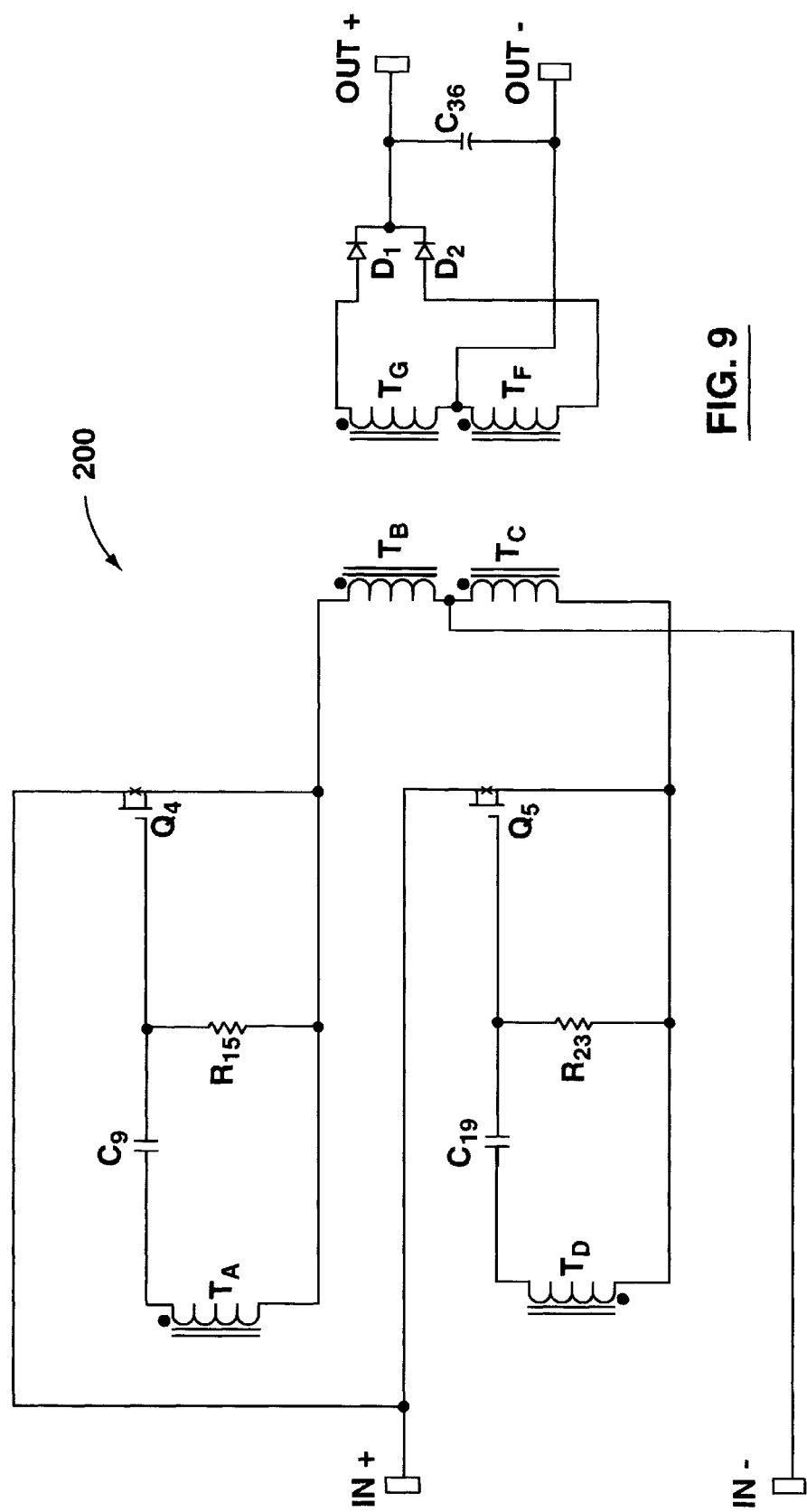
FIG. 9 is a circuit diagram of another embodiment of the self-oscillating power converter of the present invention implemented as a push-pull power converter with minimal components.

Referring now to FIG. 9, a push-pull power converter 200 is shown which uses minimal components and which has a common-drain configuration. All components shown are identical to those of power converter 10 of FIG. 1. However, gate stopper resistors $R_{14}$ and $R_{22}$ of FIG. 1 are not used as they are not necessary when the circuit is designed to avoid high frequency oscillations (greater than 100 MHz). Further, damping resistors $R_2$ and $R_1$ of FIG. 1 are not included, since it is possible to configure the transformer windings so that resistors $R_2$ and $R_1$ are not needed to control the effect of leakage inductances. Finally, zener diodes $Z_1$, $Z_2$, $Z_3$, and $Z_4$ are not included as they are not needed if the circuit is designed to prevent the voltage from going higher than the allowable voltage limits for the gate of transistors $Q_4$ and $Q_5$. It should be noted that while power converter 200 is shown to have a common-drain configuration, as indicated above, it would also be possible to implement converter 200 in a common-source configuration.

Once power converter 200 is started (with a conventional starter circuit) and transistor $Q_4$ starts to turn on, the voltage across terminals IN– and IN+ will be applied to primary winding $T_B$. This in turn will generate a positive voltage across gate drive winding $T_A$ (with respect to the dot) which will, in turn serve to further drive the gate of transistor $Q_4$ which will increase the rate at which transistor $Q_4$ turns on. Simultaneously, a negative voltage will be generated across gate drive winding $T_D$ (on the end opposite to the dot) which will further drive transistor $Q_5$ off. Analogous voltage and current characteristics will be generated by power converter 200 as were discussed in respect of power converter 10, as would be conventionally understood in the absence of resistors $R_1$, $R_2$, $R_{14}$, $R_{22}$ and zener diodes $Z_1$, $Z_2$, $Z_3$, and $Z_4$. Accordingly, all the benefits of efficiency, reduced EMI emissions and self-balancing apply equally to power converter 200, as previously discussed in respect of power converter 10.

Referring now to FIG. 10, a push-pull power converter 300 is shown having a common-source configuration. This circuit contains identical components to those of power converter 50 of FIG. 7 and they are identified as such. Power converter 300 capacitively couples the gates of transistor $Q_4$ and $Q_5$ to the opposing legs of the push-pull circuit. It should be noted that the process of charging and discharging capacitors $C_9$ and $C_{19}$ through resistors $R_{15}$ and $R_{23}$, respectively is still incorporated into the design of power converter 300. While this embodiment does not have the EMI reduction or self-balancing features or the core saturation protection of power converter 10, the parasitic effects associated with gate drive transformers have been eliminated and there are fewer parts.

Once power converter 300 is started and transistor $Q_4$ starts to turn on, the voltage across terminals IN– and IN+ will be applied across primary winding $T_B$. Transistor $Q_4$ will then conduct and connect terminal IN– with the gate of transistor $Q_5$ through capacitor $C_{19}$ and transistor $Q_5$ will be hard driven off. Once the voltage across capacitor $C_9$ starts discharging through resistor $R_{15}$ to terminal IN– past the threshold of transistor $Q_4$, transistor $Q_4$ will start turning off.

As transistor $Q_4$ starts to turn off, this will cause the voltage on the drain of $Q_4$ to climb relative to the terminal IN–. This will cause current to flow through capacitor $C_{19}$ which will in turn flow into the gate of transistor $Q_5$ to turn on transistor $Q_5$.

Accordingly, as transistor $Q_5$ starts to turn on, the voltage on the drain of transistor $Q_5$ will begin drop. By virtue of the magnetization currents within the circuit, this will cause the voltage at capacitor $C_9$ to decrease due to increased current flow out of the gate of transistor $Q_4$ which serves to accelerate the turn-off of transistor $Q_4$. At the same time, the voltages across capacitor $C_{19}$ and at the gate of transistor $Q_5$ will start to discharge through resistor $R_{23}$ until the threshold voltage is met and transistor $Q_5$ starts to turn off. As transistor $Q_5$ starts to turn off, this will cause the voltage on the drain of transistor $Q_5$ to rise relative to the terminal IN–. This will cause current to flow through capacitor $C_9$ into the gate of transistor $Q_4$ to turn on transistor $Q_4$ wherein the process will repeat itself.

It should be noted that power converter 300 does not allow for soft-switching as was the case with transformer coupled power converters 10, 50, 100 and 200, since in converter 300 the rate of switching is no longer controlled by the rate at which voltage is applied across gate drive windings $T_A$ and $T_D$ (i.e. the transformer characteristic). It should also be noted that this embodiment cannot be implemented using common drain configuration using n-channel transistors $Q_4$ and $Q_5$ but that a common-drain embodiment could be built using p-channel transistors. Power converter 300 achieves efficiency by switching fast and hard and achieves a reduced parts count as it can be easily built out of few parts and the transformer can be easily constructed.

Referring now to FIG. 11, a push-pull power converter 400 is shown having a combination of a capacitively coupled gate drive and a transformer gate drive, as have been discussed previously. This circuit contains identical components to those of power converter 50 of FIG. 7 and they are identified as such. Transistors $Q_4$ and $Q_5$ of power converter 400 have a common-source configuration. While power converter 400 is more prone to becoming unbalanced due to the mixed nature of the circuit (e.g. the circuit coupled side may switch faster than the transformer coupled side), circuit component values can be adjusted to compensate for any switching mismatch between the gate drives. Further, the restoring effects of the transformer coupled section provide significant circuit stability.

Once power converter 400 is started and transistor $Q_4$ starts to turn on, the voltage across terminals IN– and IN+ will be applied to primary winding $T_B$. A negative voltage will then be generated across transformer coupled gate drive transformer $T_A$ (with respect to the dot) which will increasingly drive transistor $Q_5$ off. Once the voltage across capacitor $C_9$ starts discharging through resistor $R_{15}$ to terminal IN– past the threshold of transistor $Q_4$, transistor $Q_4$ will start turning off. As transistor $Q_4$ starts to turn off, this will cause the voltage on the drain of $Q_4$ to climb relative to the terminal IN–. This will cause the voltage across primary winding $T_B$ to decrease and accordingly the voltage across gate drive winding $T_A$ will also decrease. This will cause a positive voltage to build up on capacitor $C_{19}$ which will in turn drive the gate of transistor $Q_5$ to turn on transistor $Q_5$.

Accordingly, as transistor $Q_5$ starts to turn on, the voltage on the drain of transistor $Q_5$ will begin drop. By virtue of the magnetization currents within the circuit, the voltage at capacitor $C_9$ will decrease due to increased current flow out of the gate of transistor $Q_4$ which serves to accelerate the turn-off of transistor $Q_4$. At the same time, gate drive winding $T_A$ will accelerate the turn on of transistor $Q_5$. Once transistor $Q_4$ is fully off and transistor $Q_5$ is fully on, the voltages across capacitor $C_{19}$ and at the gate of transistor $Q_5$ will start to discharge through resistor $R_{23}$ until the threshold voltage is passed and transistor $Q_5$ starts to turn off. As transistor $Q_5$ starts to turn off, this will cause the voltage on the drain of transistor $Q_5$ to rise relative to the terminal IN−. This will cause current to flow through capacitor $C_9$ into the gate of transistor $Q_4$ to turn on transistor $Q_4$ wherein the process will repeat itself.

Figure 12:
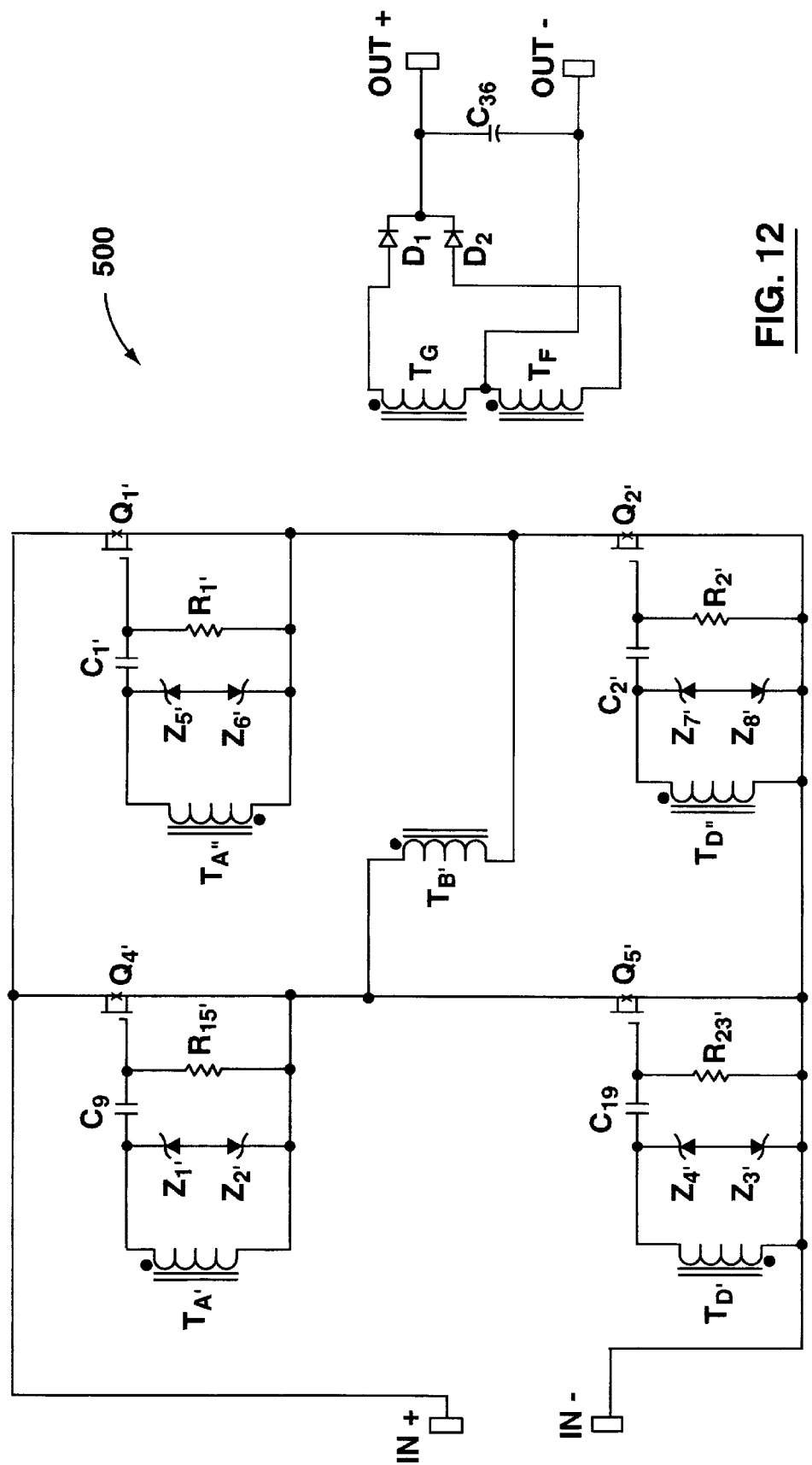
FIG. 12 is a circuit diagram of another embodiment of the self-oscillation power converter of the present invention implemented as a transformer coupled full-bridge power converter.

FIG. 12 shows a full bridge power converter 500 with four transformer coupled drive circuits for transistors $Q_{1'}$, $Q_{2'}$, $Q_{4'}$ and $Q_{5'}$. Each transformer drive circuit contains a gate drive transformer winding ($T_{A'}$, $T_{D'}$, $T_{A''}$, or $T_{D''}$), a capacitor ($C_{9'}$, $C_{19'}$, $C_{1'}$, or $C_{2'}$), zener diode pairs ($Z_{1'}$ and $Z_{2'}$, $Z_{3'}$ and $Z_{4'}$, $Z_{5'}$ and $Z_{6'}$, or $Z_{7'}$ and $Z_{8'}$), and a resistor ($R_{15'}$, $R_{23'}$, $R_{1'}$, or $R_{2'}$), respectively. As shown, power converter 500 has one primary winding $T_{B'}$ which can be oriented in both polarities such that orientation is reversed for each cycle. As is conventionally known, diagonal pairs of transistors (i.e. transistors $Q_{4'}$, and $Q_{2'}$ and transistors $Q_{1'}$ and $Q_{5'}$) will alternately conduct, thus achieving current reversal in the transformer primary winding $T_{B'}$.

Once transistors $Q_{2'}$ and $Q_{4'}$ start to turn on (using a starting circuit or the like), the voltage across terminals IN− and IN+ will be applied across primary winding $T_{B'}$. This in turn will generate positive voltages across gate drive windings $T_{A'}$ and $T_{D''}$ (with respect to the dot) which will, in turn serve to further drive the gates of transistors $Q_{4'}$ and $Q_{2'}$ respectively. This will increase the rate at which transistors $Q_{4'}$ and $Q_{2'}$ turn on. Simultaneously, negative voltages will be generated across gate drive windings $T_{D'}$ and $T_{A''}$ (on the end opposite to the dot) which will further drive transistors $Q_{5'}$ and $Q_{1'}$ off, respectively. At this point current flow will be 'downwards' through primary winding $T_{B'}$.

Once the voltages across capacitors $C_{9'}$ and $C_{2'}$ start discharging through resistors $R_{15'}$ and $R_{2'}$ to terminals IN+ and IN−, respectively, and reach the threshold of transistors $Q_{4'}$ and $Q_{2'}$, transistors $Q_{4'}$ and $Q_{2'}$ will start turning off and the voltage across primary winding $T_{B'}$ will start to drop. Simultaneously, a positive voltage will be generated across gate drive windings $T_{D'}$ and $T_{A''}$ (on the end opposite to the dot) which will drive the gates of transistors $Q_{5'}$ and $Q_{1}$, to turn on respectively. The voltage between terminals IN+ and IN− will be applied across primary winding $T_{B'}$ in an opposite manner as before and an increased positive voltage (on the end opposite the dot) will appear across gate drive windings $T_{D'}$ and $T_{A''}$. Accordingly, an acceleration in the rate at which transistors $Q_{5'}$ and $Q_{1'}$ turn on will result. Simultaneously, negative voltages will be generated across gate drive windings $T_{A'}$ and $T_{D''}$ (at the dot) which will further drive transistors $Q_4$ and $Q_{2'}$ off, respectively. At this point current flow will be 'downwards' through primary winding $T_{B'}$.

Since power converter 500 embodies four transformer coupled transistors, all the benefits of efficiency, reduced EMI emissions and self-balancing discussed in association with power converter 10 apply equally to power converter 500.

FIG. 13 shows half-bridge power converter 600 with two transformer coupled drive circuits for transistors $Q_{4'}$ and $Q_{5''}$. Half-bridge power converter 600 is identical to full-bridge power converter 500 except for the replacement of transistor $Q_{1'}$, capacitor $C_{1'}$, gate drive winding $T_{A''}$, zener diodes $Z_{5'}$ and $Z_{6'}$ and resistor $R_{1'}$, with capacitor $C_{38}$ and transistor $Q_{2''}$, capacitor $C_{2'}$, gate drive winding $T_{D''}$, zener diodes $Z_{7'}$ and $Z_{8'}$ and resistor $R_{2'}$ with capacitor $C_{40}$ as shown, to form an AC-coupled return path. Power converter 600 has one primary winding $T_{B'}$ which can be oriented in both polarities such that orientation is reversed for each cycle, as is conventionally known. Transistors $Q_{4'}$ and $Q_{5'}$ will alternately conduct, thus achieving current reversal in the transformer primary winding $T_{B''}$.

Since power converter 600 embodies two transformer coupled transistors, all the benefits of efficiency, reduced EMI emissions and self-balancing discussed in association with power converter 10 apply equally to power converter 600.

FIG. 14 shows a full-bridge power converter 700 having two capacitively coupled drive circuits for transistors $Q_{5'}$ and $Q_{2'}$ and two transformer coupled drive circuits for transistors $Q_{4'}$ and $Q_1$. This circuit contains identical components to those of power converter 500 of FIG. 11 and they are identified as such with the exception that gate drive windings $T_{D'}$ and $T_{D''}$ are not included.

As shown, power converter 700 has one primary winding $T_{B'}$ which can be oriented in both polarities such that orientation is reversed for each cycle. As is conventionally known, diagonal pairs of transistors (i.e. transistors $Q_{4'}$ and $Q_{2'}$ and transistors $Q_{1'}$ and $Q_{5'}$) will alternately conduct, thus achieving current reversal in the transformer primary winding $T_{B''}$.

Once the voltage across capacitor $C_{9'}$ starts discharging through resistor $R_{15'}$ to terminal IN− past the threshold of transistor $Q'_4$, transistor $Q_{4'}$ will start turning off. As transistor $Q_{4'}$ starts to turn off, this will cause the voltage on the drain of $Q_{4'}$ to climb relative to the terminal IN−. This will cause the voltage across gate drive winding $T_{B'}$ cause a voltage to build up on capacitor $C_{19'}$ which will in turn drive the gate of transistor $Q_{5'}$ to turn on transistor $Q_{5''}$.

Once transistors $Q_{2'}$ and $Q_{4'}$ start to turn on (using a starting circuit or the like), the voltage across terminals IN− and IN+ will begin to be applied across primary winding $T_{B''}$. This in turn will generate a positive voltage is generated across gate drive winding $T_{A'}$ (with respect to the dot) which will, in turn serve to further drive the gates of transistors $Q_{4'}$ which will increase the rate at which transistors $Q_{4'}$ turns on. Similarly, a negative voltage is generated across gate drive winding $T_{A''}$ (on the opposite end of the dot) which ensures the turn-off of transistor $Q_{1''}$. Simultaneously, terminal IN+ is connected to the gate of transistor $Q_{2'}$ through capacitor $C_{2'}$ and is driven hard on. As transistor $Q_{2'}$ starts to turn on, terminal IN− is coupled to the gate of transistor $Q_{5'}$ through capacitor $C_{19'}$ and transistor $Q_{5'}$ will be hard driven off. At this point current flow will be 'downwards' through primary winding $T_{B''}$.

Once the voltages across capacitors $C_{9'}$ and $C_{2'}$ start discharging through resistors $R_{15'}$ and $R_{2'}$ to terminal IN− past the threshold of transistors $Q_{4'}$ and $Q_{2'}$, transistors $Q_{4'}$ and $Q_{2'}$ will start turning off. As transistor $Q_4$ starts to turn off the voltage across primary winding $T_{B'}$ is reduced and the positive voltage across gate drive winding $T_{B'}$ and the negative voltage across gate drive winding $T_{A''}$ are both reduced to assist in the turn-off transitions of transistor $Q_4$ and the turnon transition of transistor $Q_{1''}$. Simultaneously, as transistor $Q_{2'}$ starts to turn off, this will cause the voltage on the drain of $Q_{5'}$ to climb relative to the terminal IN−. This will cause current to flow through capacitor $C_{19'}$ which will in turn flow into the gate of transistor $Q_{5'}$ to turn on transistor $Q_{5'}$, wherein the process will repeat itself. At this point current flow will be 'upwards' through primary winding $T_{B''}$.

Since power converter 700 includes two coupled capacitor transistors, the benefits of reduced EMI emissions and self-balancing discussed in association with power converter 10 do not apply to power converter 700. However, power converter 700 still provides an efficient and low cost implementation.

FIG. 15 shows half-bridge power converter 800 with two transformer coupled drive circuits for transistors $Q_{4'}$ and $Q_{5'}$. Half-bridge power converter 800 is identical to full-bridge power converter 700 except for the replacement of transistor $Q_{1'}$, capacitor $C_{1'}$, gate drive winding $T_{A''}$, zener diodes $Z_{5'}$ and $Z_{6'}$ and resistor $R_{1'}$, with capacitor $C_{38}$ and transistor $Q_{2'}$, capacitor $C_{2'}$, zener diodes $Z_{7'}$ and $Z_{8'}$ and resistor $R_{2'}$ with capacitor $C_{40}$ as shown, to form an AC-coupled return path. Power converter 800 has one primary winding $T_{B'}$ which can be oriented in both polarities such that orientation is reversed for each cycle, as is conventionally known. Transistors $Q_{4'}$ and $Q_{5'}$ will alternately conduct, thus achieving current reversal in the transformer primary winding $T_{B''}$.

Since power converter 800 embodies two capacitor coupled transistors, the benefits of reduced EMI emissions and self-balancing discussed in association with power converter 10 do not apply to power converter 800. However, power converter 800 still provides an efficient and low cost implementation.

In summary, various embodiments of the present invention provide a number of advantages. First, power converter 10 can achieve comparable power efficiencies to forced oscillator power converters while using fewer electronic components then are typically associated with forced oscillating approaches. The self-optimized switching speeds which result from the regenerative nature of the gate drive mechanism allows power converter 10 to achieve slower switching speeds without any loss of efficiency. Accordingly, power converter 10 generates significantly reduced EMI emissions without sacrificing power efficiency. Further, EMI is reduced in the common-drain configuration of power converter 10 as the drains of the transistors prevent capacitive coupled noise from being generated by the rapidly moving source. Finally, power converter 10 has a self-balancing feature which serves to alter the gate drive waveforms to achieve a balanced transistor switching characteristic.

As is conventionally understood, power converter 10 can be provided with additional transformer windings for multiple device outputs or it can be front-end integrated with various filters or conditioning apparatus. Further, it should be noted that the frequency range of operation of power converter 10 can be affected by changing the turns ratio of various winding pairs, improve the coupling, change resistance, change capacitances, can change values of resistors, capacitors etc. The inventor has found it preferable to run power converter 10 at between 90 and 250 KHz. Further, the DC voltage provided by power converter 10 can be varied to comply with application requirements by adjusting the transformer turns ratio, as is conventionally known. The inventor has found that power converter 10 can be operated to produce voltage between 5 to 500 volts.

As will be apparent to persons skilled in the art, various modifications and adaptations of the structure described above are possible without departure from the present invention, the scope of which is defined in the appended claims.

I claim:

1. A self oscillating power converter circuit having:
   (a) a source of direct current voltage;
   (b) a drive transformer having first and second primary windings and a first control terminal winding for generating a first control voltage, said first control terminal winding being transformer coupled to said first primary winding;
   (c) first and second transistors connected across said first and second primary windings, said first transistor having a first control terminal coupled to said first control terminal winding, said first control terminal having a first control terminal capacitance, said first control terminal capacitance being charged in response to said first control voltage, and said first and second transistors alternately being turned on and off;
   (d) a first feedback path for said first transistor including said first control terminal winding, said first control terminal winding being phased with said first primary winding such that said direct current voltage provides regenerative feedback at said first transistor control terminal;
   (e) a first resistance coupled between said first control terminal and said first primary winding for discharging said first control terminal capacitance, and;
   (f) a first coupling capacitance coupled to said first transistor control terminal for allowing said first control terminal capacitance to be discharged through said first resistance,
   wherein said first resistance is coupled in parallel with the combination of said first control terminal winding and said first coupling capacitance and wherein said first transistor turns on in response to the charging of said first control terminal capacitance and turns off in response to the discharging of said first control terminal capacitance.

2. The circuit of claim 1, wherein said second transistor has a second control terminal and a second feedback path which includes a second control terminal winding for generating a second control voltage, said second control terminal having a second control terminal capacitance, said second control terminal capacitance charging in response to said second control voltage, said second control terminal winding being phased with said second primary winding such that said direct current voltage provides regenerative feedback at said second control terminal, a second resistance being coupled between said second control terminal and said second primary winding for discharging said second control terminal capacitance, said feedback path including a second coupling capacitance coupled to said second control terminal for allowing said second control terminal capacitance to be discharged through said second resistance wherein said second resistance is coupled in parallel with the combination of said second control terminal winding and said second coupling capacitance and wherein said second transistor turns on in response to said charging of said second control terminal capacitance and turns off in response to said discharging of said control terminal capacitance.

3. The circuit of claim 2, further having a voltage limiting circuit coupled between said first control terminal and said first primary winding and between said second control terminal and said second primary winding for limiting the voltage applied at said first and second control terminals.

4. The circuit of claim 2, further having a voltage limiting circuit coupled between said first control terminal and said first primary winding and between said second control terminal and said second primary winding for limiting the voltage across said first and second control terminal windings.

5. The circuit of claim 3 or 4, wherein said voltage limiting circuit includes a backward biased zener diode pair.

6. The circuit of claim 2 further having a damping circuit coupled between said first control terminal winding and said first coupling capacitance and between said second control terminal winding and said second coupling capacitance for reducing high frequency oscillations within converter.

7. The circuit of claim 6 wherein said damping circuit includes a resistor.

8. The circuit of claim 2 further having a gate stopper circuit coupled between said first control terminal and said first coupling capacitor and between said second control terminal and said second coupling capacitor for reducing high frequency oscillations within said converter.

9. The circuit of claim 8 wherein said gate stopper circuit includes a resistor.

10. The circuit of claim 1 or 2 wherein said transistors are MOSFET transistors.

11. The circuit of claim 10 wherein said MOSFET transistors are connected in a common drain configuration.

12. The circuit of claim 1 wherein said first primary winding and said first control terminal winding have a coupling coefficient greater than 0.999.

13. The circuit of claim 2 wherein said second primary winding and said second control terminal winding have a coupling coefficient greater than 0.999.

14. The circuit of claim 2 further having a pair of secondary windings for coupling said circuit to a load such that the coupling coefficient of said first and second control terminal windings to said first and second primary windings is higher than the coupling coefficient of said first and second control terminal windings to said secondary windings.

15. The circuit of claim 1 further having a starter circuit for initiating oscillations in said converter by applying a start-up signal to one of said first and second transistors.

16. A self oscillating power converter circuit having:
    (a) a source of direct current voltage;
    (b) a drive transformer having first and second primary windings;
    (c) first and second transistors connected across said first and second primary windings, said first transistor having a first control terminal, said second transistor having a second control terminal, said first control terminal having a first control terminal capacitance and said second control terminal having a second control terminal capacitance:
    (d) a first feedback path for said first transistor including a first coupling capacitor and said first and second primary windings and a second feedback path for said second transistor including a second coupling capacitor and said first and second primary windings; and
    (e) a first resistor coupled to said first control terminal and to said second transistor for discharging said first control terminal capacitance and a second resistor coupled to said second control terminal and to said first transistor for discharging said second control terminal capacitance,
    wherein said first resistor is coupled in parallel with said first coupling capacitor and said second resistor is coupled in parallel with said second coupling capacitor.

17. A self oscillating power converter circuit having:
    (a) a source of direct current voltage;
    (b) a drive transformer having a primary winding and a first control terminal winding for generating a first control voltage, said first control terminal winding being transformer coupled to said primary winding;
    (c) first and second transistors connected across said primary winding, said first and second transistors alternately turning on and off, said first transistor having a first control terminal coupled to said first control terminal winding and said first control terminal having a first control terminal capacitance, said first control terminal capacitance being charged in response to said first control voltage;
    (d) a first feedback path for said first transistor including said first control terminal winding, said first control terminal winding being phased with said primary winding such that said direct current voltage provides regenerative feedback at said first transistor control terminal;
    (e) a first coupling capacitance coupled to said first transistor control terminal within said first feedback path for allowing said first control terminal capacitance to be discharged; and
    (f) a first resistor coupled to said first control terminal and to said primary winding for discharging said first control terminal capacitance,
    wherein said first resistor is coupled in parallel with the combination of said first control terminal winding and said first coupling capacitance and wherein said first transistor turns on in response to the charging of said first control terminal capacitance and turns off in response to the discharging of said first control terminal capacitance.

18. The circuit of claim 2 wherein said circuit further comprises:
    (a) a first output winding and a second output winding, said first output winding being transformer coupled to said first primary winding and said second output winding being transformer coupled to said second primary winding;
    a first output terminal and a second output terminal, each of said output terminals being coupled to each of said first output winding and said second output winding,
    wherein an output direct current voltage corresponding to said source of direct current voltage is available at said first and second output terminals.

19. The circuit of claim 18 wherein:
    (a) a first rectifier is coupled between said first output winding and said first output terminal for rectifying a first output half-wave appearing across said first output winding; and
    (b) a second rectifier is coupled between said second output winding and said first output terminal for rectifying a second output half-wave appearing across said second output winding,
    wherein said output direct current voltage is a full wave voltage.

20. The circuit of claim 19 wherein an output capacitor is coupled between said first output terminal and said second output terminal.

* * * * *

UNITED STATES PATENT AND TRADEMARK OFFICE
CERTIFICATE OF CORRECTION

PATENT NO. : 6,108,219
DATED : August 22, 2000
INVENTOR(S) : John French

It is certified that error appears in the above-identified patent and that said Letters Patent is hereby corrected as shown below:

Corrections to be made are <u>underlined</u>.

<u>Column 5,</u>
Line 49, should read: "... <u>w</u>ill increase ..."

<u>Column 8,</u>
Lines 18-19, delete the following, including all quotation marks:
   <u>voltages and transistors Q4 and Q5", add"</u>
Line 22, <u>delete quotations</u> after the following words: drive winding $T_A$.
Lines 18-22 should read:
   "voltages of transistors $Q_4$ and $Q_5$ and capacitor $C_9$ will have a DC voltage across it and accordingly will be discharged. Capacitor $C_9$ will act as an open circuit, effectively isolating the gate of transistor $Q_4$ from gate drive winding $T_A$. After the gate ..."
Line 30, please change "... resistor $R_1$ ..." to read "... resistor $R_{15}$ ..."

Signed and Sealed this

Fourteenth Day of August, 2001

*Attest:*

NICHOLAS P. GODICI
*Attesting Officer*     Acting Director of the United States Patent and Trademark Office